United States Patent
Wiley

(10) Patent No.: US 10,587,391 B2
(45) Date of Patent: Mar. 10, 2020

(54) SIMPLIFIED C-PHY HIGH-SPEED REVERSE MODE

(71) Applicant: QUALCOMM Incorporated, San Diego, CA (US)

(72) Inventor: George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/218,936

(22) Filed: Dec. 13, 2018

(65) Prior Publication Data

US 2019/0215137 A1 Jul. 11, 2019

Related U.S. Application Data

(60) Provisional application No. 62/615,345, filed on Jan. 9, 2018.

(51) Int. Cl.
| | |
|---|---|
| *H04L 7/00* | (2006.01) |
| *H04L 5/02* | (2006.01) |
| *H04L 27/26* | (2006.01) |
| *H04B 3/54* | (2006.01) |
| *G06F 13/40* | (2006.01) |
| *G06F 13/42* | (2006.01) |
| *H04L 12/40* | (2006.01) |
| *H04L 25/02* | (2006.01) |

(52) U.S. Cl.
CPC .......... *H04L 5/023* (2013.01); *G06F 13/4018* (2013.01); *G06F 13/42* (2013.01); *H04B 3/542* (2013.01); *H04L 7/007* (2013.01); *H04L 7/0008* (2013.01); *H04L 12/40032* (2013.01); *H04L 27/2602* (2013.01); *H04B 2203/542* (2013.01); *H04L 25/0272* (2013.01)

(58) Field of Classification Search
CPC . H04L 5/023; H04L 12/40032; H04L 7/0008; H04L 7/007; H04L 27/2603; H04L 25/0272; G06F 13/42; H04B 3/542; H04B 2203/542
See application file for complete search history.

(56) References Cited

U.S. PATENT DOCUMENTS

| | | | |
|---|---|---|---|
| 10,134,272 B2* | 11/2018 | Wiley | G08C 19/16 |
| 10,348,436 B2* | 7/2019 | Shokrollahi | H04L 25/03343 |
| 2010/0215118 A1* | 8/2010 | Ware | H03M 5/16 375/295 |
| 2015/0030112 A1 | 1/2015 | Wiley et al. | |
| 2017/0118039 A1 | 4/2017 | Wiley | |

OTHER PUBLICATIONS

International Search Report and Written Opinion—PCT/US2018/065711—ISA/EPO—dated Mar. 20, 2019.

* cited by examiner

*Primary Examiner* — Dac V Ha
(74) *Attorney, Agent, or Firm* — Holland & Hart LLP

(57) ABSTRACT

Systems, methods and apparatus are described that facilitate transmission of data between two devices within an electronic apparatus. A data transfer method includes receiving from a three-wire interface, a first packet of data encoded in a first sequence of symbols representing transitions in signaling state of the three wires, and transmitting on the three-wire interface, a second packet of data encoded in a second sequence of symbols representing transitions in signaling state of the three wires. The first sequence of symbols may include up to five types of symbol. The second sequence of symbols may include two or three types of symbol.

30 Claims, 17 Drawing Sheets

US 10,587,391 B2

SIMPLIFIED C-PHY HIGH-SPEED REVERSE MODE

PRIORITY CLAIM

This application claims priority to and the benefit of U.S. Provisional Patent Application Ser. No. 62/615,345 filed in the U.S. Patent Office on Jan. 9, 2018, the entire content of this application being incorporated herein by reference as if fully set forth below in its entirety and for all applicable purposes.

TECHNICAL FIELD

At least one aspect generally relates to high-speed data communication interfaces, and more particularly, to a low-complexity 3-phase signaling interface.

BACKGROUND

Manufacturers of mobile devices, such as cellular phones, may obtain components of the mobile devices from various sources, including different manufacturers. For example, the application processor in a cellular phone may be obtained from a first manufacturer, while the display for the cellular phone may be obtained from a second manufacturer. Moreover, multiple standards are defined for interconnecting certain components of the mobile devices. For example, there are multiple types of interface defined for communication between an application processor and a display or camera within mobile device, including the Display System Interface (DSI) standard specified by the Mobile Industry Processor Interface (MIPI) Alliance.

The MIPI Alliance has defined the "C-PHY" standard, which provides high-speed data communication over a trio of wires. In some interfaces, including display and camera multiple trios may provide a high bandwidth, multi-channel interface. The C-PHY interface typically can involve complex circuits to support high-speed operation. In some instances, it may be desirable to provide a low-speed communication link, for which the C-PHY interface may be considered overly complex and costly for some applications.

SUMMARY

Embodiments disclosed herein provide systems, methods and apparatus that relate to Integrated Circuit (IC) devices that may be collocated in an electronic apparatus and communicatively coupled through a three-wire communication link.

In an aspect of the disclosure, a method for data communication performed at a first device includes receiving a first packet of data through a multi-wire interface that is coupled to at least three wires, where the first packet of data is encoded in a first sequence of symbols representing transitions in signaling state of the at least three wires and transmitting a second packet of data through the multi-wire interface encoded in a second sequence of symbols representing transitions in signaling state of the at least three wires. Each symbol in the first sequence of symbols may be selected from a first group of symbols that includes a first number of types of symbol. Each symbol in the second sequence of symbols may be selected from a second group of symbols that includes a second number of types of symbol, the second number being smaller than the first number.

In one aspect, the method includes receiving a third packet of data through the multi-wire interface. The third packet of data may be encoded in a third sequence of symbols representing transitions in signaling state of the three wires, the third packet of data being responsive to the second packet of data.

In some aspects, the multi-wire interface is a three-wire interface. The first sequence of symbols may include up to five types of symbol, and the second sequence of symbols includes two or three types of symbol. The three-wire interface may be operated in accordance with a C-PHY protocol. The three-wire interface may be operated in accordance with an alternate low-power C-PHY protocol.

In some aspects, the transitions in signaling state of the at least three wires are operative to cause at least one zero-crossing in a receiver circuit coupled to the multi-wire interface. The first sequence of symbols may include a symbol operative to cause three zero-crossings in a receiver circuit coupled to the multi-wire interface. The second sequence of symbols may include symbols operative to cause no more than two zero-crossings in a receiver circuit coupled to the multi-wire interface. The second sequence of symbols may include symbols operative to cause no more than one zero-crossing in a receiver circuit coupled to the multi-wire interface.

In an aspect of the disclosure, an apparatus has a processing circuit and a communication interface configured to communicate data using a signal transmitted in different phases on all wires of a multi-wire communication link. The processing circuit may be configured to receive from the communication interface, a first packet of data encoded in a first sequence of symbols representing transitions in signaling state of at least three wires of the multi-wire communication link, and transmit on the communication interface, a second packet of data encoded in a second sequence of symbols representing transitions in signaling state of the at least three wires of the multi-wire communication link. Each symbol in the first sequence of symbols may be selected from a first group of symbols that includes a first number of types of symbol. Each symbol in the second sequence of symbols may be selected from a second group of symbols that includes a second number of types of symbol, the second number being smaller than the first number.

In one aspect, the processing circuit may be configured to receive from the communication interface, a third packet of data encoded in a third sequence of symbols representing transitions in signaling state of the at least three wires, the third packet of data being responsive to the second packet of data.

In certain aspects, the communication interface is a three-wire communication interface. The first sequence of symbols may include up to five types of symbol. The second sequence of symbols may include two or three types of symbol. The communication interface may be operated in accordance with a C-PHY protocol. The communication interface may be operated in accordance with an alternate low-power C-PHY protocol.

In some aspects, the transitions in signaling state of the three wires are operative to cause at least one zero-crossing in a receiver circuit coupled to the multi-wire communication link. The first sequence of symbols may include a symbol operative to cause three zero-crossings in a receiver circuit coupled to the multi-wire communication link. The second sequence of symbols may include symbols operative to cause no more than two zero-crossings in a receiver circuit coupled to the multi-wire communication link. The second sequence of symbols may include symbols operative to cause no more than one zero-crossing in a receiver circuit coupled to the multi-wire communication link.

In an aspect of the disclosure, an apparatus includes means for receiving packets of receive data from a multi-wire interface that is coupled to at least three wires, including a first packet of data that is encoded in a first sequence of symbols representing transitions in signaling state of the at least three wires, and means for transmitting packets of transmit data through the multi-wire interface, including a second packet of data that is encoded in a second sequence of symbols representing transitions in signaling state of the at least three wires. Each symbol in the first sequence of symbols may be selected from a first group of symbols that includes a first number of types of symbol. Each symbol in the second sequence of symbols may be selected from a second group of symbols that includes a second number of types of symbol, the second number being smaller than the first number.

In an aspect of the disclosure, a computer-readable medium stores data and instructions, including computer-executable code. The code may cause a computer or computing circuit receive a first packet of data through a multi-wire interface that is coupled to at least three wires, and transmit a second packet of data through the multi-wire interface encoded in a second sequence of symbols representing transitions in signaling state of the at least three wires. The first packet of data may be encoded in a first sequence of symbols representing transitions in signaling state of the at least three wires. Each symbol in the first sequence of symbols may be selected from a first group of symbols that includes a first number of types of symbol. Each symbol in the second sequence of symbols may be selected from a second group of symbols that includes a second number of types of symbol, the second number being smaller than the first number.

DETAILED DESCRIPTION

Figure 1:
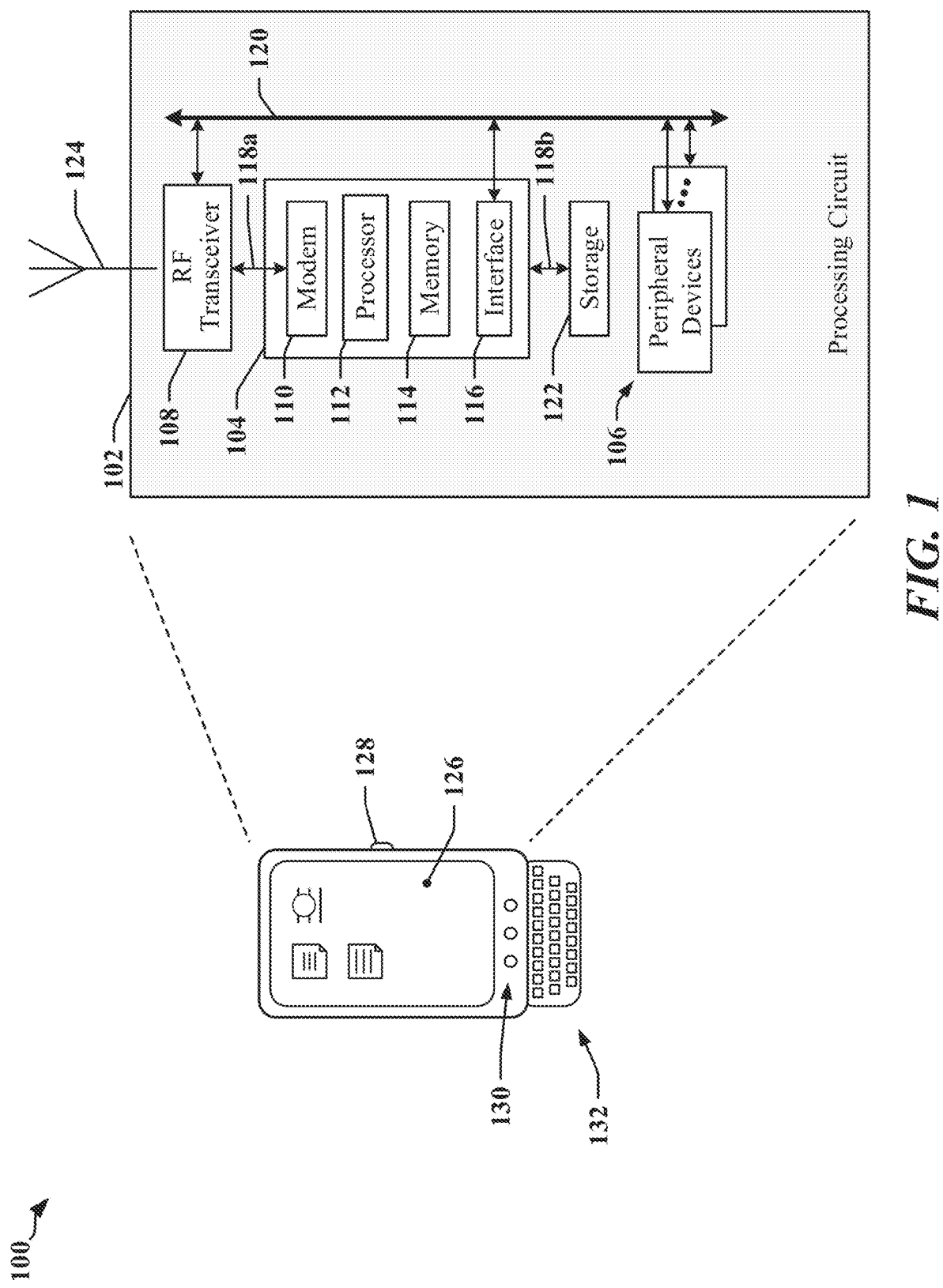
FIG. 1 depicts an apparatus employing a data link between IC devices that selectively operates according to one of a plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on, or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), Blu-Ray, and floppy disk where disks usually reproduce data magnetically, while discs reproduce data optically with lasers. Combinations of the above should also be included within the scope of computer-readable media.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or another transitory or non-transitory processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
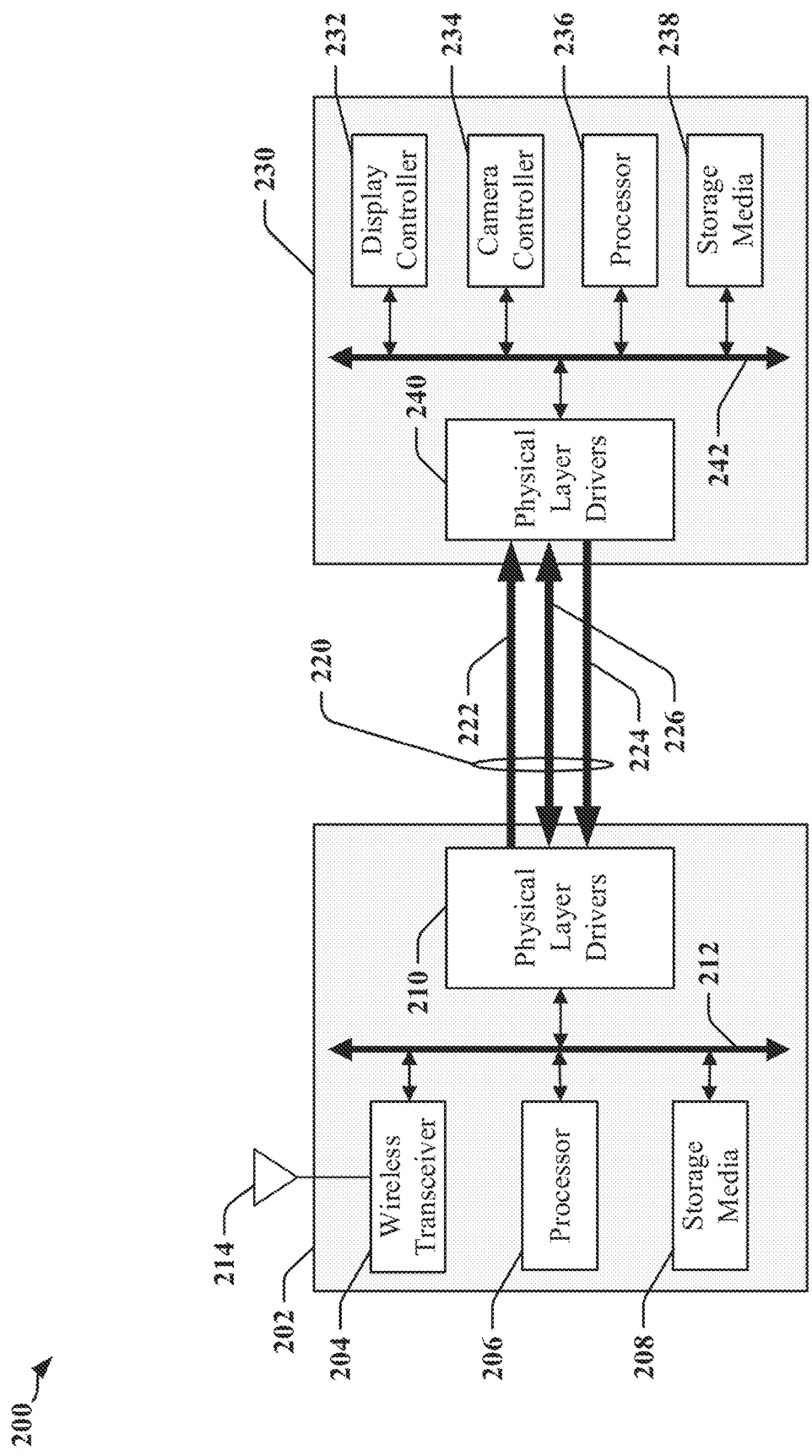
FIG. 2 illustrates a system architecture for an apparatus employing a data link between IC devices.

FIG. 2 illustrates certain aspects of an apparatus 200 such as a mobile apparatus that employs a communication link 220 to connect various subcomponents. In one example, the apparatus 200 includes a plurality of IC devices 202 and 230 that exchange data and control information through the communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a mobile computing device while a second IC device 230 may be located in a display section of mobile computing device. In another example, a portion of the communication link 220 may include a cable or optical connection.

The communication link 220 may provide multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communication channel 222 may be referred to as a forward channel 222 while a second communication channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communication link 220. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining radio frequency (RF) communication through an RF transceiver 204 and an antenna 214, while the second IC device 230 may support a user interface that manages or operates a display controller 232. In the example, the second IC device 230 may be adapted to control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse channel 224 may be operated in the same manner as the forward channel 222, and the forward channel 222 and reverse channel 224 may be capable of transmitting at comparable speeds or at different speeds, where speed may be expressed as data transfer rate and/or clocking rates. The forward and reverse data transfer rates may be substantially the same or differ by orders of magnitude, depending on the application. In some applications, a single bidirectional channel 226 may support communication between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

In some instances, the forward and reverse channels 222 and 224 may be configured or adapted to support a wide video graphics array (WVGA) 80 frames per second LCD driver IC without a frame buffer, delivering pixel data at 810 Mbps for display refresh. In another example, the forward and reverse channels 222 and 224 may be configured or adapted to enable communication between with dynamic random-access memory (DRAM), such as double data rate (DDR) synchronous DRAM (SDRAM). Encoding devices 210 and/or 230 may be configured to encode multiple bits per clock transition, and multiple sets of wires can be used to transmit and receive data from the SDRAM, control signals, address signals, and other signals.

The forward and reverse channels 222 and 224 may comply with, or be compatible with application-specific industry standards. In one example, the MIPI Alliance standard defines physical layer interfaces between an application processor IC device 202 and an IC device 230 that supports the camera or display in a mobile device. The MIPI Alliance standard includes specifications that govern the operational characteristics of products that comply with MIPI Alliance specifications for mobile devices. In some instances, the MIPI Alliance standard may define interfaces that employ complimentary metal-oxide-semiconductor (CMOS) parallel buses.

The MIPI Alliance defines standards and specifications that address communication modes that may affect all aspects of operations in a mobile device, including the antenna, peripherals, the modem and application processors. For example, the MIPI Alliance defines protocols for a camera serial interface (CSI) and a display serial interface (DSI). The MIPI Alliance CSI-2 specification defines a wired interface between a camera and Application Processor and the MIPI Alliance DSI or DSI-2 specification defines a wired interface between an Application Processor and a display. The low-level physical layer (PHY) interface in each of these applications can be the MIPI Alliance C-PHY or the MIPI Alliance D-PHY.

MIPI Alliance C-PHY Interface

According to certain aspects disclosed herein relate to systems and apparatus that include interfaces that employ multi-phase data encoding and decoding for communicating between IC devices 202 and 230. A multi-phase encoder may drive a plurality of conductors (i.e., M conductors). The M conductors typically include three or more conductors, and each conductor may be referred to as a wire, although the M conductors may include conductive traces on a circuit board or within a conductive layer of a semiconductor IC device. In one example, the C-PHY physical layer interface technology defined by the MIPI Alliance may be used to connect camera and display devices 230 to an application processor device 202. The C-PHY interface employs 3-phase symbol encoding to transmit data symbols on 3-wire lanes, or "trios" where each trio includes an embedded clock.

The M conductors may be divided into a plurality of transmission groups, each group encoding a portion of a block of data to be transmitted. An N-phase encoding scheme is defined in which bits of data are encoded in phase transitions and polarity changes on the M conductors. Decoding does not rely on independent conductors or pairs of conductors and timing information can be derived directly from phase and/or polarity transitions in the M conductors. N-Phase polarity data transfer can be applied to any physical signaling interface, including electrical, optical and radio frequency (RF) interfaces.

In the C-PHY example, a 3-phase encoding scheme for a 3-wire system may define three phase states and two polarities, providing 6 states and 5 possible transitions from each state. Deterministic voltage and/or current changes may be detected and decoded to extract data from the three wires.

Figure 3:
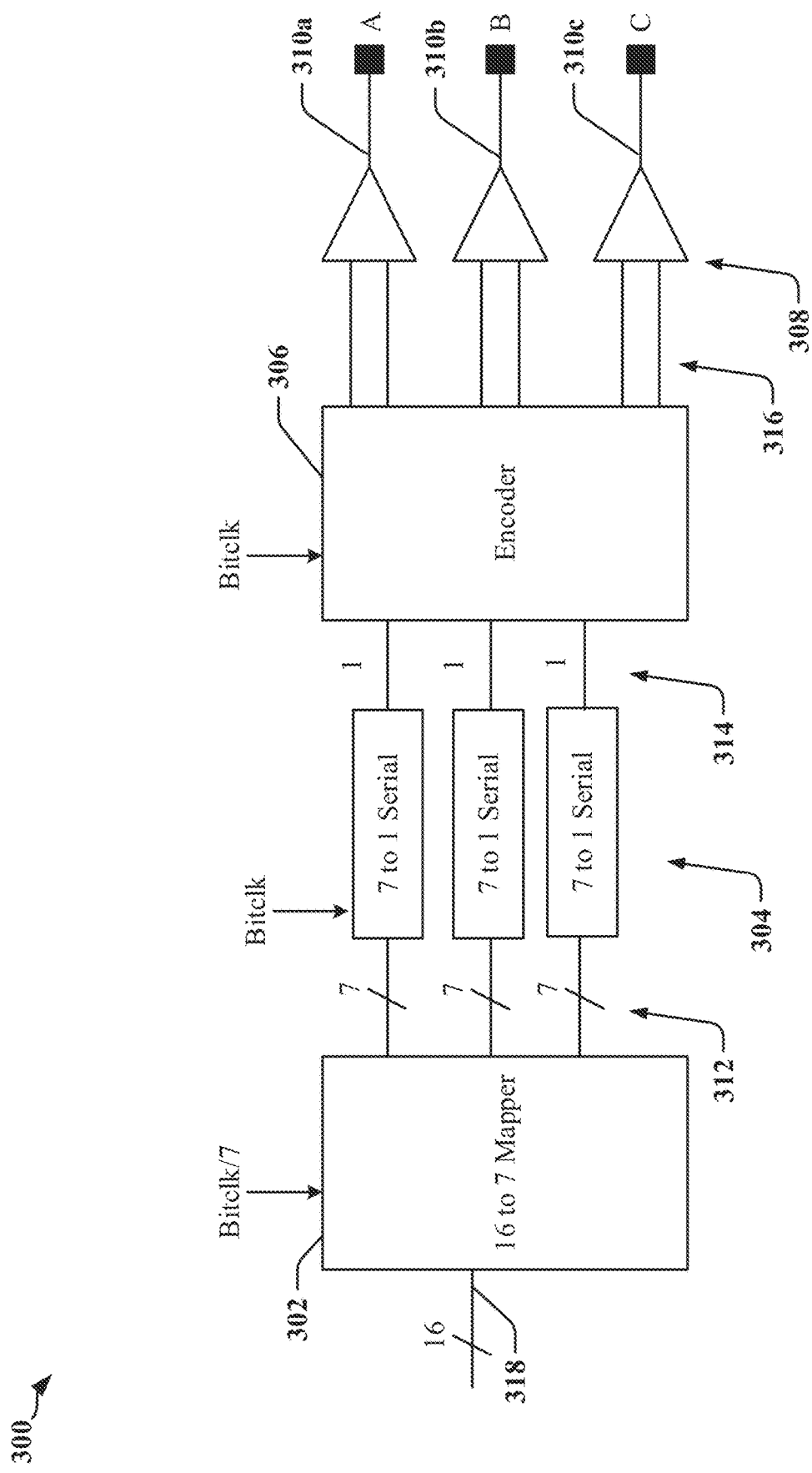
FIG. 3 illustrates an example of an N-phase polarity data encoder.

FIG. 3 illustrates an example 300 of the use of N-phase polarity encoding to implement certain aspects of the communication link 220 depicted in FIG. 2. The illustrated example 300 may relate to a 3-wire link or to a 3-wire portion of a link that has more than three wires. The communication link 220 may include a wired bus having a plurality of signal wires, which may be configured to carry 3-phase encoded data in a high-speed digital interface, such as a mobile display digital interface (MDDI). One or more of the channels 222, 224 and 226 may be configured or adapted to use 3-phase polarity encoding. The physical layer drivers 210 and 240 may be adapted to encode and decode 3-phase polarity encoded data transmitted on the communication link 220. The use of 3-phase polarity encoding provides for high speed data transfer and may consume half or less of the power of other interfaces because fewer than 3 drivers are active in 3-phase polarity encoded communication links 220 at any time. 3-phase polarity encoding devices 210 and/or 240 can encode multiple bits per transition on the communication link 220. In one example, a combination of 3-phase encoding and polarity encoding may be used to support a wide video graphics array (WVGA), 80 frames per second LCD driver IC without a frame buffer, delivering pixel data for display refresh at 810 Mbps over three or more wires.

In the depicted example 300, a polarity encoding transmitter is configured for M=3 and N=3 consistent or compliant with C-PHY specifications. The example of 3-wire, 3-phase encoding is selected solely for the purpose of simplifying descriptions of certain aspects of this disclosure. The principles and techniques disclosed for 3-wire, 3-phase encoders can be applied in other configurations of M-wire, N-phase polarity encoders, and may comply or be compatible with other interface standards.

When 3-phase polarity encoding is used, connectors such as signal wires 310a, 310b and 310c on a 3-wire bus may be undriven, driven positive, or driven negative. An undriven signal wire 310a, 310b or 310c may be in a high-impedance state. An undriven signal wire 310a, 310b or 310c may be driven or pulled to a voltage level that lies substantially halfway between the positive and negative voltage levels provided on driven signal wires. An undriven signal wire 310a, 310b or 310c may have no current flowing through it. In the example 300, each signal wire 310a, 310b and 310c may be in one of three states (denoted as +1, −1, or 0) using drivers 308. In one example, drivers 308 may include unit-level current-mode drivers. In another example, drivers 308 may drive opposite polarity voltages on two wires 310a and 310b while the third wire 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one signal wire 310a, 310b or 310c is changed from the symbol transmitted in the preceding transmission interval.

In the example, 300, a mapper 302 may receive 16-bit input data 318, and the mapper 302 may map the 16-bit input data 318 to 7 symbols 312 for transmitting sequentially over the signal wires 310a, 310b and 310c. An M-wire, N-phase encoder 306 configured for 3-wire, 3-phase encoding receives the 7 symbols 312 produced by the mapper one symbol 314 at a time and computes the state of each signal wire 310a, 310b and 310c for each symbol interval, based on the immediately preceding state of the signal wires 310a, 310b and 310c. The 7 symbols 312 may be serialized using parallel-to-serial converters 304, for example. The encoder 306 selects the states of the signal wires 310a, 310b and 310c based on the input symbol 314 and the previous states of signal wires 310a, 310b and 310c. The encoder 306 may provide a set of multi-bit signals 316 that controls the operation of each of the drivers 308.

The use of M-wire, N-phase encoding permits a number of bits to be encoded in a plurality of symbols where the bits per symbol is not an integer. In the simple example of a 3-wire, 3-phase system, there are 3 available combinations of 2 wires, which may be driven simultaneously, and 2 possible combinations of polarity on any pair of wires that is driven simultaneously, yielding 6 possible states. Since each transition occurs from a current state, 5 of the 6 states are available at every transition. The state of at least one wire is typically required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
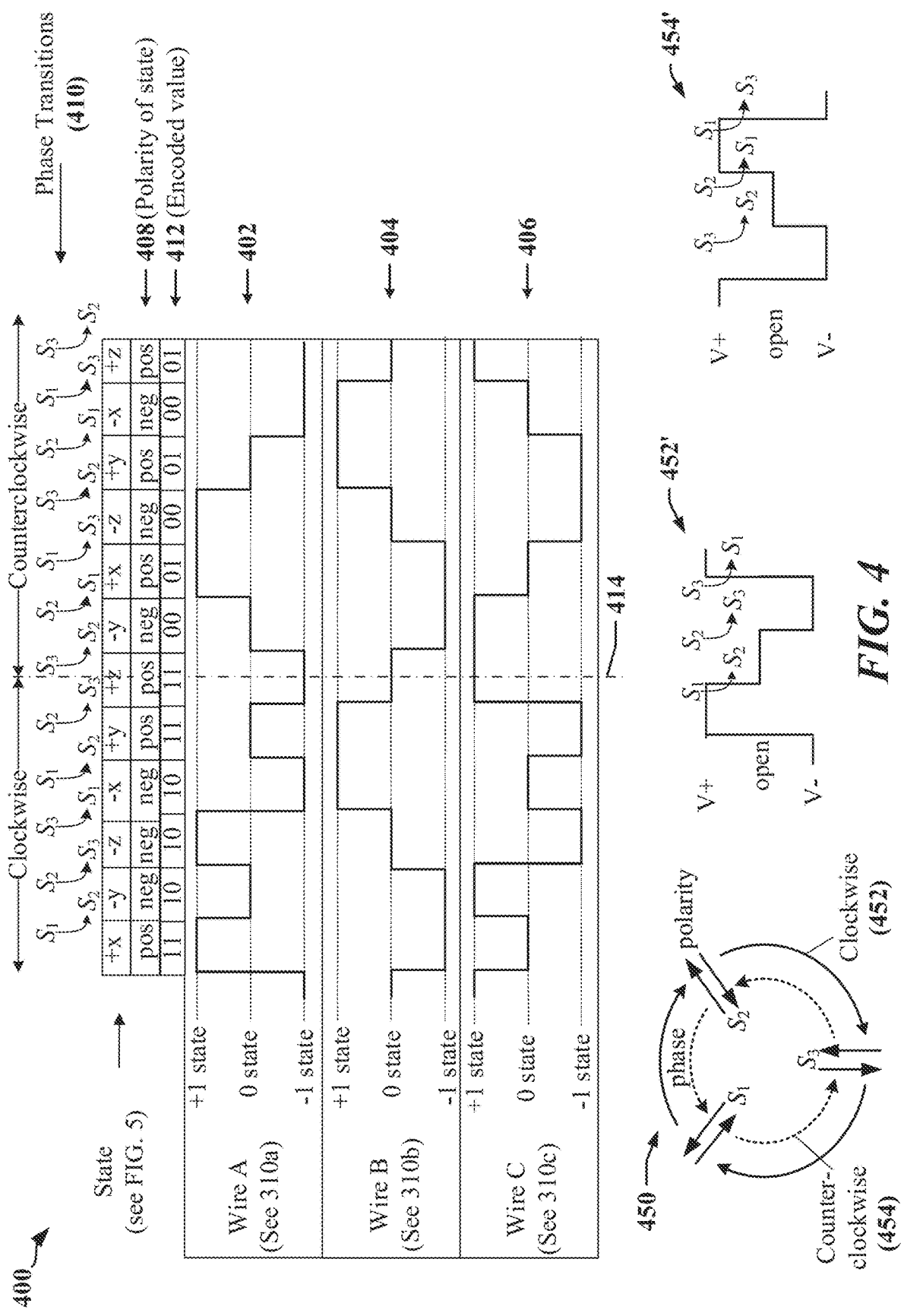
FIG. 4 illustrates signaling in an example of an N-phase polarity encoded interface.

FIG. 4 illustrates an example of signaling 400 employing a 3-phase modulation data-encoding scheme based on the circular state transition diagram 450. According to the data-encoding scheme, a 3-phase signal may rotate in two directions and may be transmitted on three wires 310a, 310b and 310c, identified as connectors A, B, and C. Each of the three signals is independently driven on the wires 310a, 310b, 310c. Each of the three signals includes the 3-phase signal, with each signal being 120 degrees out of phase relative to the other two signals. At any point in time, each of the three wires 310a, 310b, 310c is in a different one of the states {+1, 0, −1}. At any point in time, each of the three wires 310a, 310b, 310c in a 3-wire system is in a different state than the other two wires. When more than three conductors or wires are used, two or more pairs of wires may be in the same state. The illustrated encoding scheme may also encode information in the polarity of the two wires 310a, 310b and/or 310c that are actively driven to the +1 and −1 states. Polarity is indicated at 408 for the sequence of states depicted.

At any phase state in the illustrated 3-wire example, exactly two of the wires 310a, 310b, 310c carry a signal which is effectively a differential signal for that phase state, while the third wire 310a, 310b or 310c is undriven. The phase state for each wire 310a, 310b, 310c may be determined by voltage difference between the wire 310a, 310b or 310c and at least one other wire 310a, 310b and/or 310c, or by the direction of current flow, or lack of current flow, in the wire 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a 3-wire, 3-phase communication link, clockwise rotations ($S_1$ to $S_2$), ($S_2$ to $S_3$), and/or ($S_3$ to $S_1$) at a phase transition 410 (between states) may be used to encode a logic 1, while counter-clockwise rotations ($S_1$ to $S_3$), ($S_3$ to $S_2$), and/or ($S_2$ to $S_1$) at the phase transition 410 may be used to encode a logic 0. Accordingly, a bit may be encoded at each transition by controlling whether the signal is "rotating" clockwise or counter-clockwise. For example, a logic 1 may be encoded when the three wires 310a, 310b, 310c transition from phase state $S_1$ to phase state $S_2$ and a logic 0 may be encoded when the three wires 310a, 310b, 310c transition from phase state $S_1$ to phase state $S_3$. In the 3-wire example depicted, direction of rotation may be easily determined based on which of the three wires 310a, 310b, 310c is undriven before and after the transition.

Information may also be encoded in the polarity and/or changes of polarity of state 408 of the driven wires 310a, 310b, 310c, or in the direction of current flow or changes in the direction of current flow between two wires 310a, 310b, 310c. Signals 402, 404, and 406 illustrate voltage levels applied to wires 310a, 310b, 310c, respectively at each phase state in a 3-wire, 3-phase link. At any time, a first wire 310a, 310b, 310c is coupled to a more positive voltage (+V, for example), a second wire 310a, 310b, 310c is coupled to a more negative voltage (−V, for example), while the third wire 310a, 310b, 310c may be open-circuited. As such, one polarity encoding state may be determined by the current flow between the first and second wires 310a, 310b, 310c or the voltage polarities of the first and second wires 310a, 310b, 310c. In some embodiments, two bits of data 412 may be encoded in each phase transition 410. A decoder may determine the direction of signal phase rotation to obtain the first bit. The second bit may be determined based on the polarity difference between two of the signals 402, 404 and 406. In some instances, the second bit may be determined based on a change or lack of change in polarity of the differential signal transmitted on a pair of the wires 310a, 310b, 310c. The decoder having determined direction of rotation can determine the phase state and the polarity of the voltage applied between the two active wires 310a, 310b and/or 310c, or the direction of current flow through the two active wires 310a, 310b and/or 310c.

In the example of the 3-wire, 3-phase link described herein, one bit of data may be encoded in the rotation, or phase change in the 3-wire, 3-phase link, and an additional bit may be encoded in the polarity or changes in polarity of two driven wires. In certain embodiments, more than two bits can be encoded in each transition of a 3-wire, 3-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

In one example, an encoder may transmit symbols using 6 wires with two pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| A B C D | A B C E | A B C F | A B D E | A B D F |
|---------|---------|---------|---------|---------|
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

++-- +--+ +-+- -+-+ -++- --++

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right).$$

Figure 5:
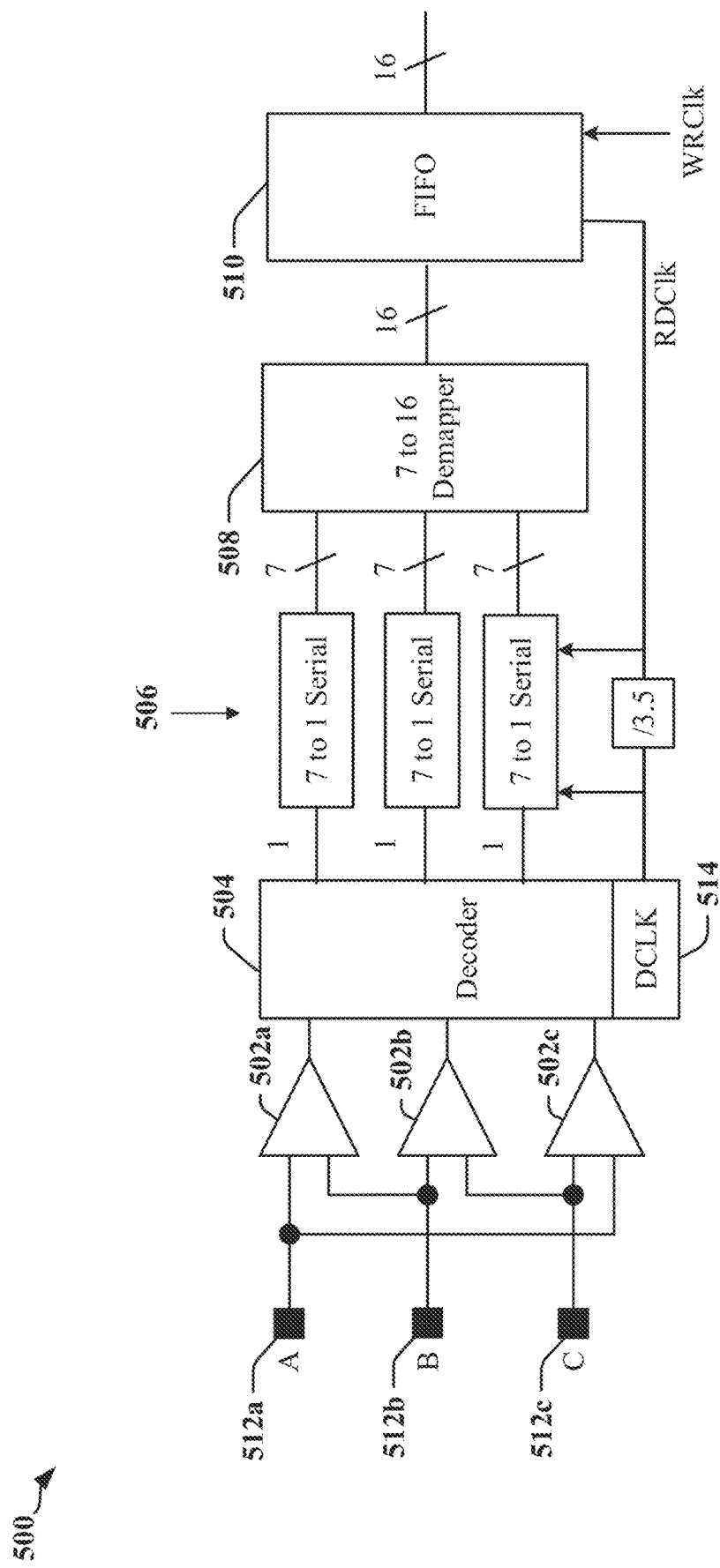
FIG. 5 illustrates an example of an N-phase polarity decoder.

FIG. 5 illustrates an example of a receiver 500 that may be used in a 3-wire, 3-phase PHY. The 3-wire, 3-phase receiver 500 is provided as an example illustrative of certain principles of operation applicable to other configurations of M-wire, N-phase receivers. Comparators or differential receivers 502a, 502b, 502c and a decoder 504 are configured to provide a digital representation of the state of each of three transmission lines 512a, 512b and 512c, as well as the change in the state of the three transmission lines compared to the state transmitted in the previous symbol period. Seven consecutive states are assembled by serial-to-parallel converters 506 to produce a set of 7 symbols to be processed by demapper 508 to obtain 16 bits of data that may be buffered in a first-in-first-out (FIFO) register 510, or the like.

Figure 6:
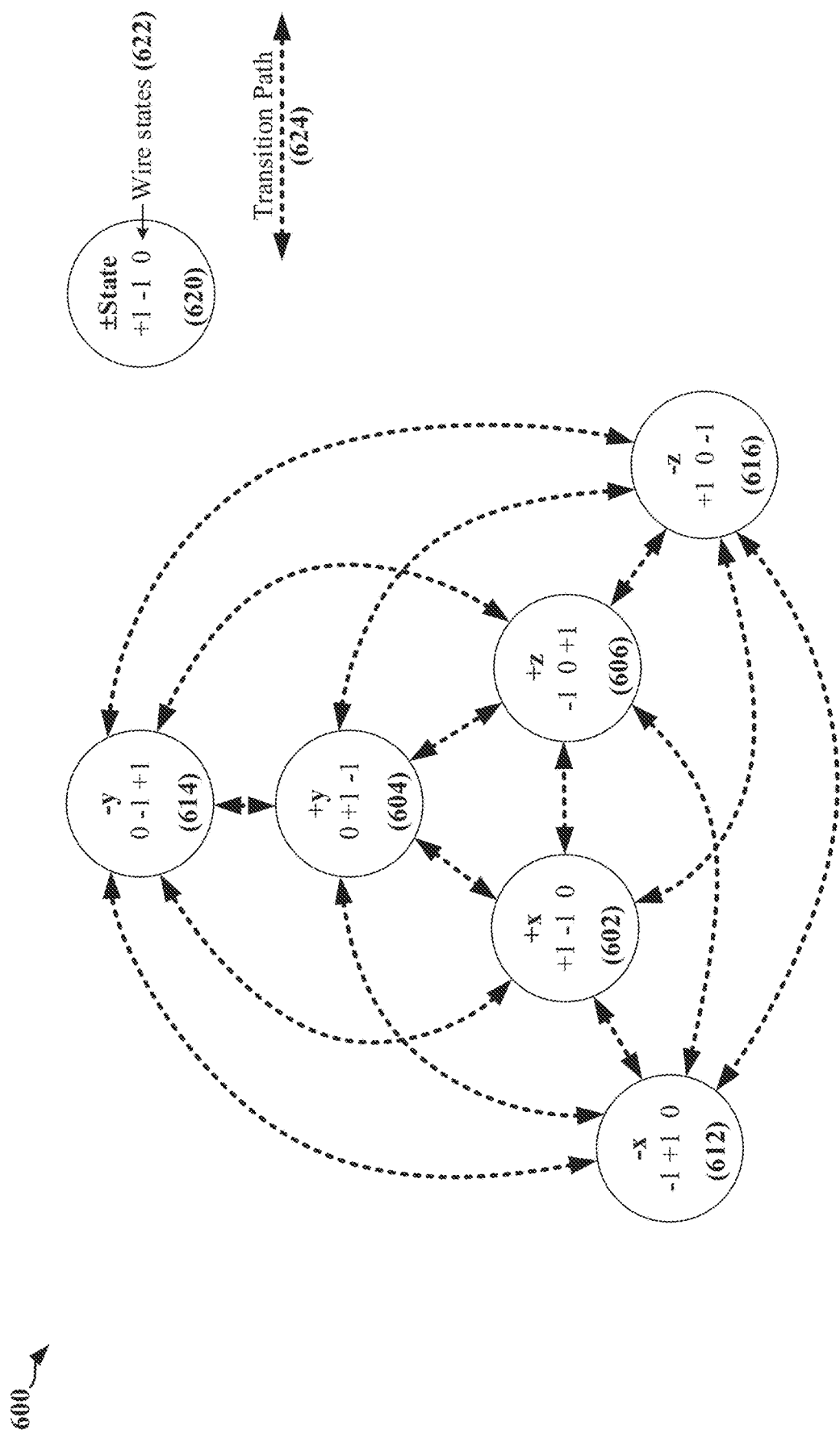
FIG. 6 is a state diagram illustrating the possible state transitions in the example of a 3-wire, 3-phase communication link.

FIG. 6 is a state diagram 600 illustrating 6 states and 30 possible state transitions in the example of a 3-wire, 3-phase communication link. The communication link may be operated in accordance with MIPI Alliance C-PHY protocols, for example. The signaling state of the communication link is defined by symbols transmitted for a duration of time (the symbol transmission interval) that is defined by a transmission clock used by a transmitter. The signaling state of the communication link may be characterized as the phase and polarity of a 3-phase signal that is transmitted on each of the three wires of the communication link, where each wire carries a version of the 3-phase signal that is phase-shifted with respect to the other two wires. The phase shift may be nominally set to 120°. That is, for each symbol transmission interval, the signal transmitted on each wire is in a different phase than the signals transmitted on the other two wires. The three phases may include two opposite polarity signaling states and an undriven state. In one example, the three states include a +V state, a 0V state and a -V state. In another example, the three states include a +V state, a +V/2 state and a 0V state, where the +V/2 may be the undriven state. A 3-phase signal may provide three possible phase states {P1, P2, P3}, and the 3-phase signal may rotate in two directions: P1→P2→P3→P1 or P1→P3→P2→P1. In general, a current symbol defines a first signaling state of the three wires, and the next symbol defines a second signaling state of the three wires, where at least one wire changes signaling state between the first and second signaling states.

FIG. 6 expands on the state transition diagram 450 in FIG. 4 by depicting all possible states 602, 604, 606, 612, 614 and 616 and illustrates the operation of one example of transition encoding with respect to the individual states 602, 604, 606, 612, 614 and 616. The possible states 602, 604, 606, 612, 614 and 616 include positive-polarity and negative-polarity versions of the phase states $S_1$, $S_2$ and $S_3$ illustrated in the state transition diagram 450 of FIG. 4. For clarity, the set of phase/polarity states are labeled alphabetically and includes {+x, -x, +y, -y, +z, -z} where, for example, +x and -x represent states with the same phase state but different polarity. As shown in the model state element 620, each state 602, 604, 606, 612, 614 and 616 in the state diagram 600 includes a field 622 showing the voltage state of signals 402, 404 and 406, which are transmitted on wires 310a, 310b and 310c, respectively. For example, in state 602 (+x) signal 402=+1, signal 404=-1 and signal 406=0.

Also shown in FIG. 6 are the possible transition paths (see, for example, the model transition path 624) between the states 602, 604, 606, 612, 614 and 616. As noted herein, clock information may be embedded in 3-phase signals by ensuring that a transition in signaling state of the communication link occurs at the boundary between each pair consecutively transmitted symbols. Five possible transitions are available from any current state 602, 604, 606, 612, 614 or 616.

Encoding in a MIPI Alliance C-PHY Interface

Figure 7:
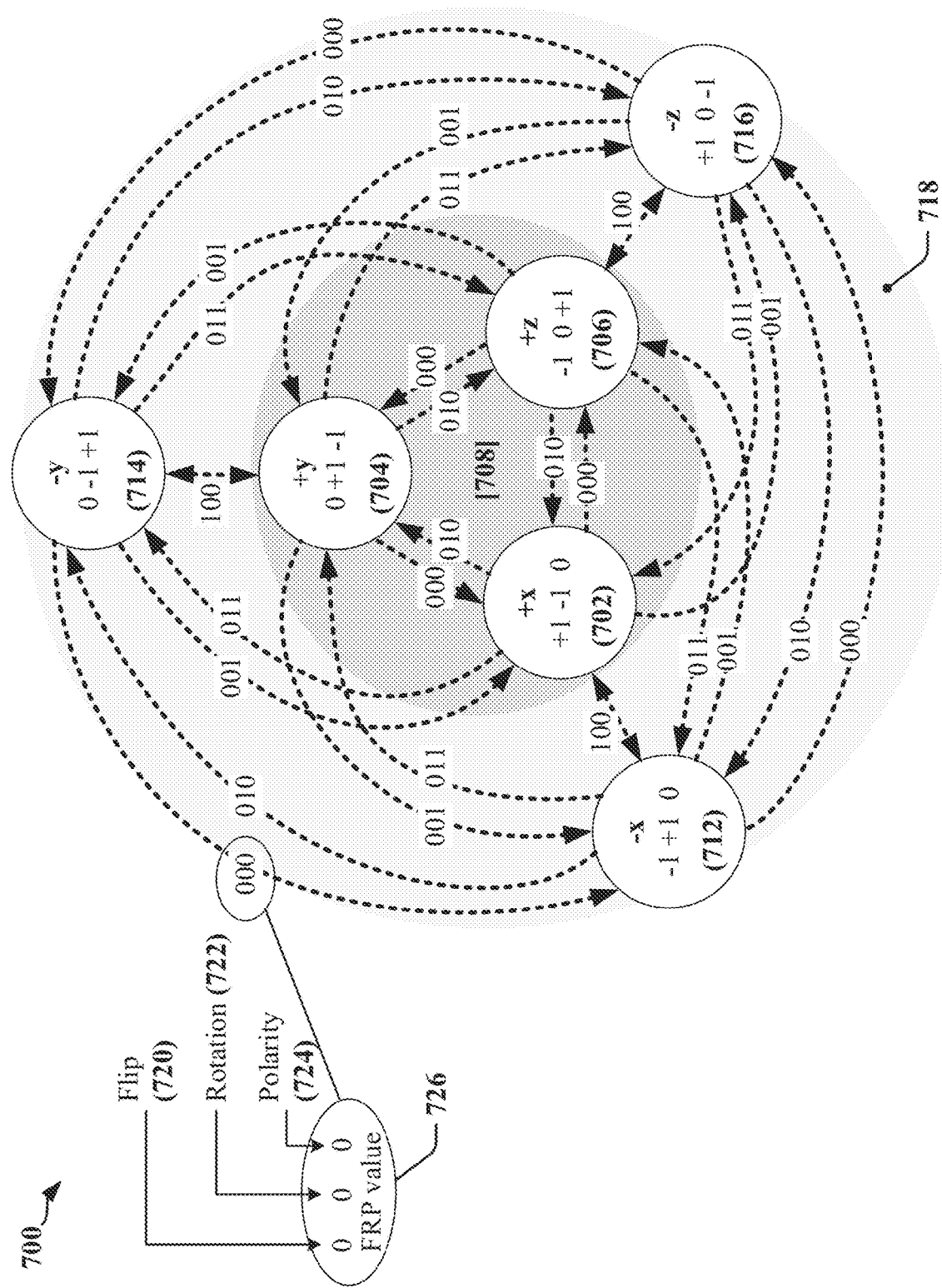
FIG. 7 is state diagram illustrating all possible signaling states and transitions in a 3-wire 3-phase interface that provides 5 available state transitions at each symbol interval in accordance with certain aspects disclosed herein.

FIG. 7 is a state transition diagram 700 illustrating the possible signaling states 702, 704, 706, 712, 714, 716 of the three wires in a 3-wire, 3-phase interface, including in a MIPI Alliance C-PHY high-speed mode interface for example. All possible transitions from each state 702, 704, 706, 712, 714, 716 are illustrated. The transitions in the state transition diagram 700 can be represented by a Flip, Rotate, Polarity (FRP) symbol 726 that has one of the three-bit binary values in the set: {000, 001, 010, 011, 100}. The Rotation bit 722 of the FRP symbol 726 indicates the direction of phase rotation associated with a transition to a next state. The Polarity bit 724 of the FRP symbol 726 is set to binary 1 when a transition to a next state involves a change in polarity. When the Flip bit 720 of the FRP symbol 726 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 726 corresponds to wire state changes for each transition. The state transition diagram 700 may be separated into an inner circle 708 that includes the positive polarity states 702, 704, 706 and an outer circle 718 that encompasses the negative polarity states 712, 714, 716.

Figure 8:
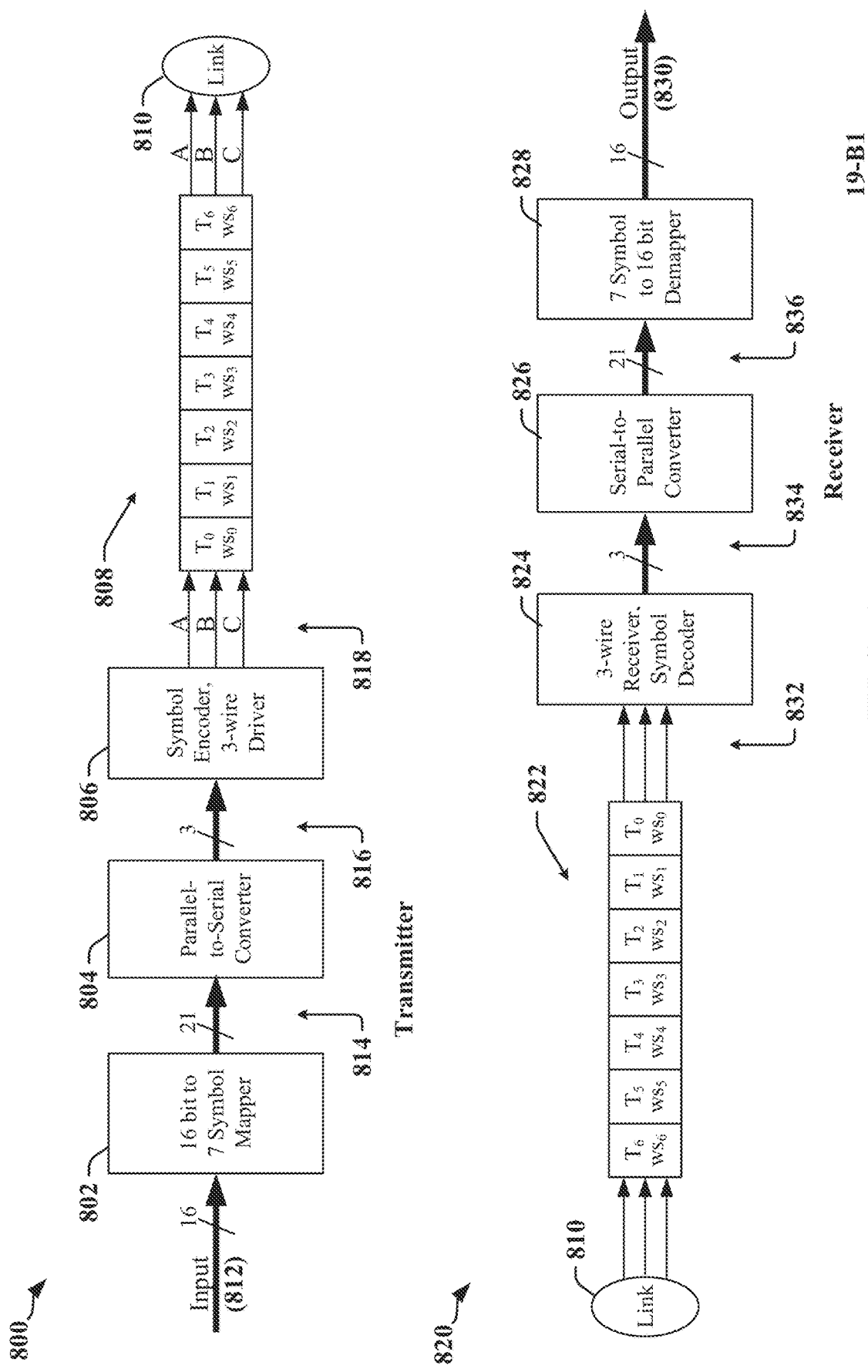
FIG. 8 illustrates a transmitter and a receiver in a 3-wire, 3-phase interface that provides 5 available state transitions, and that may be adapted in accordance with certain aspects disclosed herein.

FIG. 8 illustrates a transmitter 800 and a receiver 820 configured for a 3-wire, 3-phase interface that may use the FRP symbol 726 to select a next symbol for transmission based on the immediately preceding symbol. A 16-bit data word is received as an input 812 to a Mapper 802 in the transmitter 800. The Mapper 802 maps the 16-bit data to a 21-bit word representative of 7 FRP symbols. The 7 FRP symbols are provided in a sequence of 3-bit symbols 816 using a Parallel-To-Serial converter 804. Each symbol in the sequence of 3-bit symbols 816 may be provided to a Symbol Encoder/Driver 806 configured to produce a sequence of signaling states 808 on a 3-wire data link 810.

At the receiver 820, a Receiver/Symbol Decoder 824 decodes a sequence of symbols 822 received from the 3-wire data link 810. The Receiver/Symbol Decoder 824 produces a sequence of FRP symbols 822 that is provided to a Serial-to-Parallel Converter 826, which in turn provides a 21-bit word to a Demapper 828. The 16-bit output 830 of the Demapper 828 corresponds to the input 812 of the transmitter 800.

The transmitter 800 and receiver 820 may be operated to obtain an optimal encoding of 16-bit data, by mapping 16-bit words to 7-symbol sequences, where symbols maximize the number of signaling states 702, 704, 706, 712, 714, 716 of the three wires in a 3-wire, 3-phase interface available for encoding purposes at each symbol transition. In the example illustrated in FIG. 7, six signaling states 702, 704, 706, 712, 714, 716 are defined, with 5 possible transitions from each of the signaling states 702, 704, 706, 712, 714, 716. It will be appreciated that this encoding scheme results in a non-integer conversion ratio of 16/7~=2.285 bits per symbol and, consequently, ~2.285 bits per transition. In some implementations, it may be desirable to obtain the benefit of 3-wire, 3-phase encoding with an integer conversion ratio.

Simplified 3-Phase Encoded Interfaces

Figure 9:
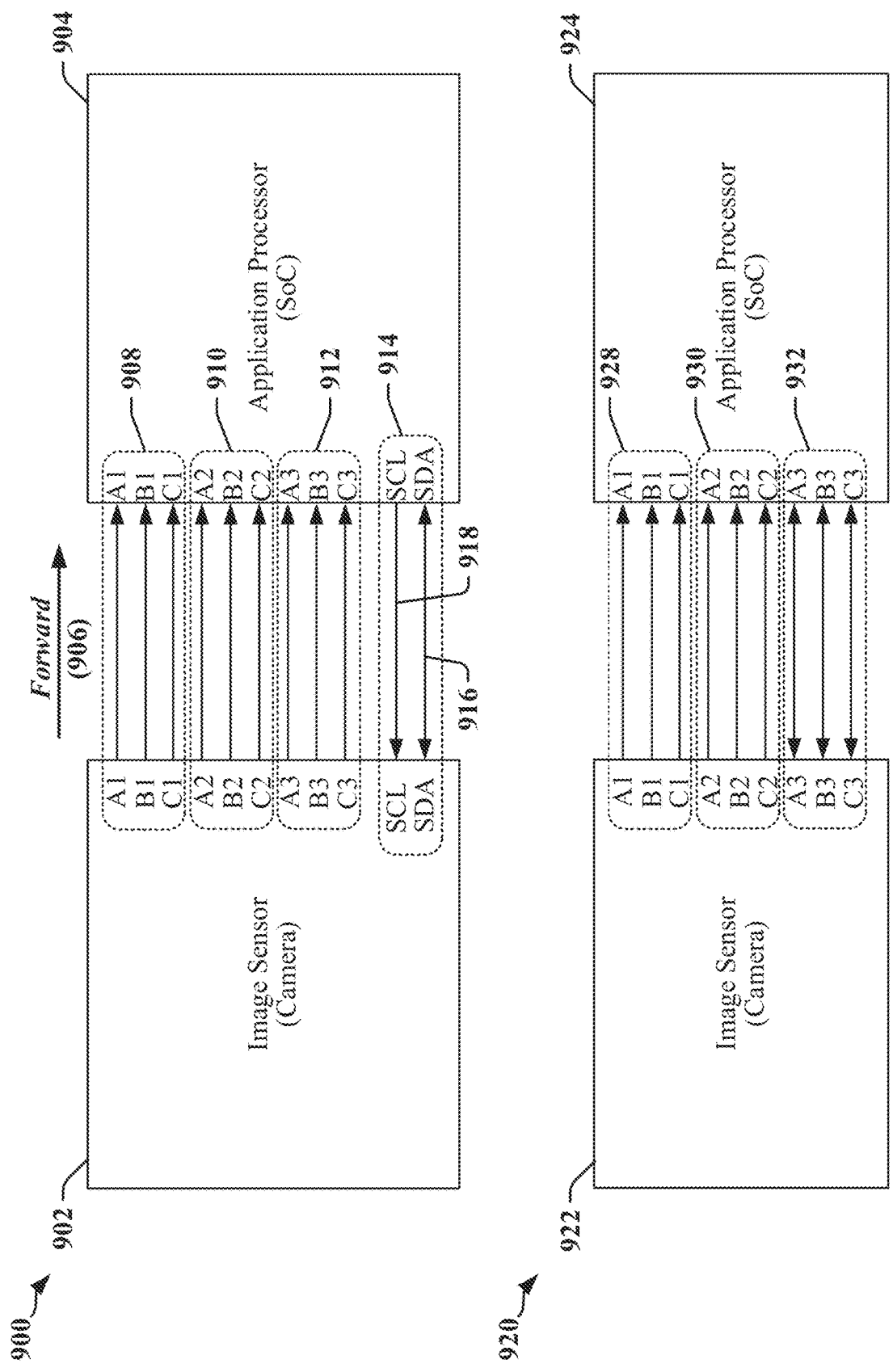
FIG. 9 illustrates a camera interface that may adapted in accordance with certain aspects disclosed herein.

The Camera Serial Interface 2 (CSI-2), as defined by MIPI Alliance, is used in many mobile devices. FIG. 9 illustrates a system 900 that uses the CSI-2-PHY interface to support communication between an image sensor 902 (e.g., a camera) and an application processor 904, which may be embodied in an SoC. High-volume pixel data generated at the image sensor 902 is transferred over three C-PHY interfaces 908, 910, 912. The application processor 904 and image sensor 902 may exchange command control information over a control data bus 914, such as the camera control interface (CCI) defined by the MIPI Alliance. A CCI-based serial bus has a clock line 918 and a data line 916. In the illustrated control data bus 914, the application processor 904 is configured as a bus master for the and the image sensor 902 is configured as a slave device. The bus master provides a clock signal on the clock line 918.

The CSI-2 camera interface uses high-speed C-PHY signals for transmission of pixel data from the image sensor 902 to the application processor 904. The separate control data bus 914 allows the application processor 904 to send control packets (Camera Control Command data) to the image sensor 902 that permit the application processor 904 to read parameters and status information (Camera Control Response data) from the image sensor 902. The CCI interface is similar to an I2C or I3C interface, and uses relatively low-speed CMOS signals. The CMOS signals are generally not suitable for communication over long cables primarily due to signal reflections on unterminated cables, and also due to ground bounce between the image sensor 902 and application processor 904.

A second system 920, which may be adapted in accordance with certain aspects disclosed herein, may send both pixel data and camera control packets over the high-speed C-PHY links 928, 930, 932. In one example, one or more of the high-speed C-PHY links 928, 930, 932 deployed between an image sensor 922 and an application processor 924 may operate in a C-PHY high-speed reverse link mode, with C-PHY fast bus turn-around. C-PHY fast bus turn-around may be implemented to change the direction of signal flow 906 over the high-speed C-PHY links 928, 930, 932 using solely high-speed signaling to orchestrate the bus turn-around event. One disadvantage of sending high-speed reverse data from the application processor 924 to the image sensor 922 is that the image sensor 922 must have a fully implemented C-PHY receiver.

Certain aspects disclosed herein provide a simplified C-PHY reverse communication mode that can simplify high-speed C-PHY receiver implementation in the image sensor 922. In one aspect, the receive clock generator of the C-PHY receiver may be simplified by eliminating or minimizing multiple zero-crossings at each symbol boundary. The transmitter in a C-PHY interface embeds clock information in transitions between consecutive symbols. Multiple zero-crossing transitions may occur at a symbol boundary and the clock generator of the C-PHY receiver is typically adapted to account for the difference in timing of the multiple zero-crossing transitions to avoid generating multiple edges in the clock, and to reduce jitter that may be attributable to the timing of the different zero-crossing transitions.

Figure 10:
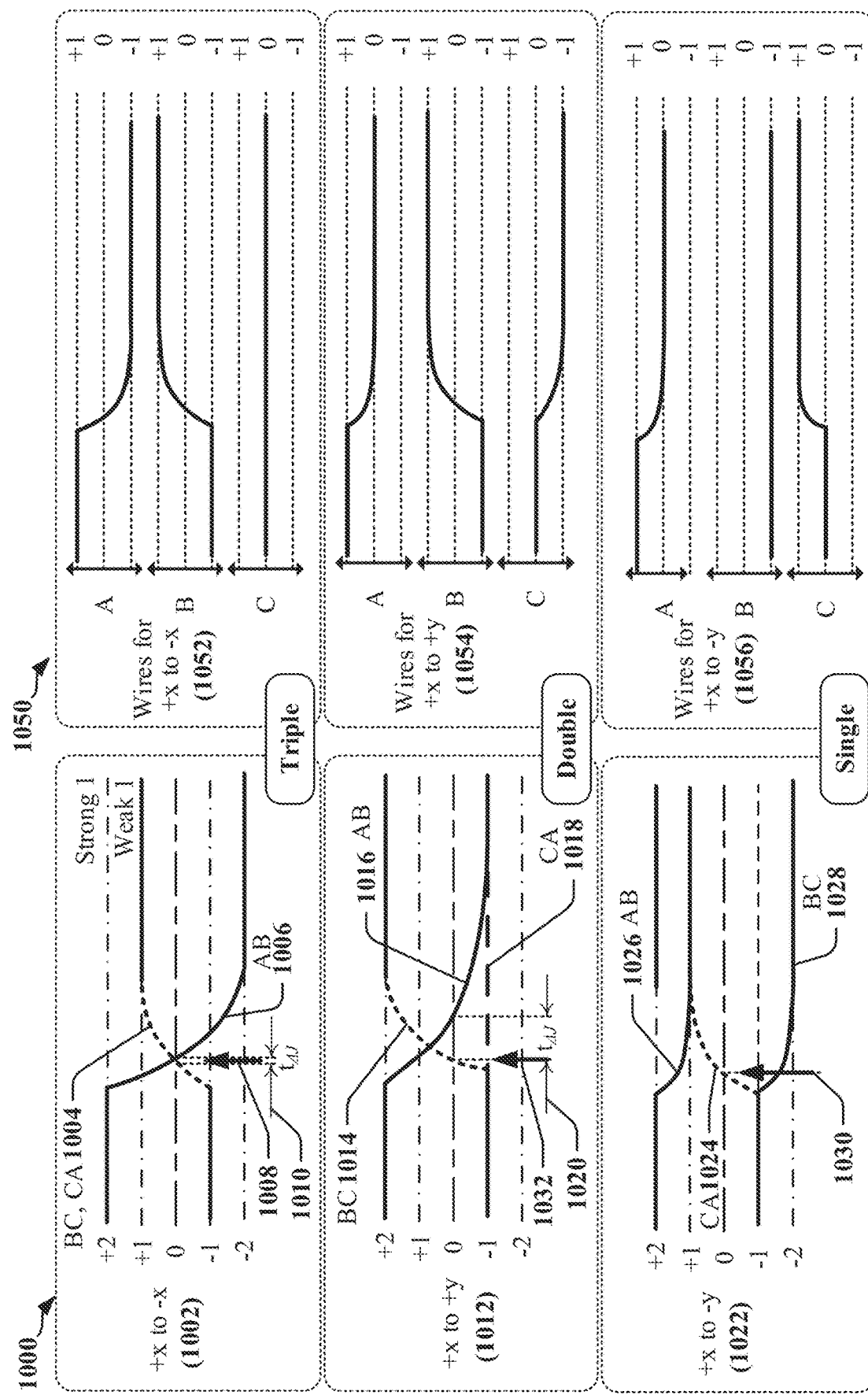
FIG. 10 illustrates transitions between symbol intervals in a C-PHY interface.

FIG. 10 include timing diagrams 1000 and 1050 representative of simplified examples of transitions from a first symbol interval (first signaling state) to a second symbol interval (first signaling state). FIG. 10 illustrates an example of signaling 1002, 1052 for a triple transition, signaling 1012, 1054 for a double transition, and signaling 1022, 1056 for a single transition. In certain aspects, eliminating the double transition symbols removes the need to mask a second transition of each double transition. Design and configuration of mask delay circuits in the receiver clock recovery circuit 514 (FIG. 5) is less constrained, and the clock recovery circuit 514 is simplified. The three transitions in the triple transition can be expected to occur in close temporal proximity, and triple transitions can be handled without severe constraints on the clock recovery circuit 514. Although there are some exceptions to this in a channel with high inter-symbol interference, the transitions can be expected to occur close together when a series of "4" FRP symbols are transmitted.

The timing diagrams 1000 and 1050 relate to an example of a C-PHY interface in which multiple receiver output transitions may occur at each symbol boundary due to slight differences in rise and fall time between the three signals of the trio of wires and due to slight differences in signal propagation times between the combinations of received signal pairs (e.g. A-B, B-C, and C-A). For the purposes of this description, the signals depicted in FIG. 10 are assumed to have no phase jitter or ISI. The initial state of a wire may be a driven state, with possible transitions to another driven state or to an undriven state. The initial state of the wire may be the undriven state, with possible transitions to a driven state.

The examples of signaling 1002, 1012 and 1022 illustrate the differences between signal wires 310a, 310b and 310c (signals A, B and C, respectively) measurable at the differential receivers 502a, 502b, 502c (FIG. 5) before and after the signal transitions shown in the set of timing diagrams 1050. In one example, the −1 state is represented by a voltage level of ¼ V, and the +1 state is represented by a positive voltage ¾ V, such that the zero-crossing occurs at ½ V. In many instances, a set of differential receivers 502a, 502b, 502c may be configured to capture transitions by comparing different combinations for two signal wires 310a, 310b and 310c. In one example, these differential receivers 502a, 502b, 502c may be configured to produce outputs by determining the difference (e.g. by subtraction) of their respective input voltages. A clock may be generated based on zero-crossings of the outputs of one or more of the differential receivers 502a, 502b, 502c. A zero-crossing may occur when a signal transitions through a 0 state represented by the voltage at the mid-point in a voltage range between a voltage representing a +1 state and a voltage representing a −1 state. In one example, the zero-crossing occurs at 0 volts when the −1 state is represented by a negative voltage (−V) and the +1 state is represented by a positive voltage (+V).

The examples of signaling 1002 and 1052 relate to a transition from symbol (+x) 702 to symbol (−x) 712 (see FIG. 7) in which signal A transitions from a +1 state to a −1 state, signal B transitions from a −1 state to a +1 state and signal C remains at the 0 state. Accordingly, the differential receiver 502a may measure a +2 difference before the AB transition 1006 and a −2 difference after the AB transition 1006, the differential receivers 502b and 502c may each measure a −1 difference before the BC and CA transitions 1004 and a +1 difference after the BC and CA transitions 1004. In this example, both the BC and CA transitions 1004 and the AB transition 1006 have zero-crossings. The zero-crossings may occur in close temporal proximity 1010 because both transitions are towards driven states. Zero-crossing transitions may occur within close proximity to a first transition 1008.

The examples of signaling 1012 and 1054 relate to a transition from symbol (+x) 702 to symbol (+y) 704 in which signal A transitions from a +1 state to a 0 state, signal B transitions from a −1 state to a +1 state and signal C transitions from a 0 state to a −1 state. Accordingly, the differential receiver 502a may measure a +2 difference before the AB transition 1016 and a −1 difference after the AB transition 1016, the differential receiver 502b may measure a −1 difference before the BC transition 1014 and a +2 difference after the BC transition 1014, and the differential receiver 502c may remain at a −1 difference through the CA "non-transition" 1018. In this example, both the BC transitions 1014 and AB transitions 1016 have zero-crossings. These zero-crossings may be separated by a significant time interval 1020. The difference may occur because the BC transition 1014 involves two signals that have a final driven state while the AB transition 1016 relates to one signal that has a final undriven state and because the BC transition 1014 has a zero-crossing at the one-third point on its way to its final value, while the AB transition 1016 has a zero-crossing at the two-thirds point on its way to its final value. For these reasons, the second zero-crossing transition does not occur within close proximity to the first zero-crossing transition 1032.

The examples of signaling 1022 and 1056 relate to a transition from symbol (+x) 702 to symbol (−y) 704 in which signal A transitions from a +1 state to a 0 state, signal B remains in the −1 state and signal C transitions from a 0 state to a +1 state. Accordingly, the differential receiver 502a may measure a +2 difference before the AB transition 1026 and a +1 difference after the AB transition 1026, the differential receiver 502b may measure a −1 difference before and a −2 difference after the BC transition 1028, and the differential receiver 502c may measure a −1 difference before the CA transition 1024 and a +1 difference after the CA transition 1024. In this example, only the CA transition 1024 has a corresponding zero-crossing transition 1030.

Simplification of clock recovery circuits 514 may be accomplished by reducing the number of FRP symbols available at each symbol interval. A first simplification may be achieved by eliminating the mapper 802 and demapper 828. A simplified symbol decoder can also be implemented.

Figure 11:
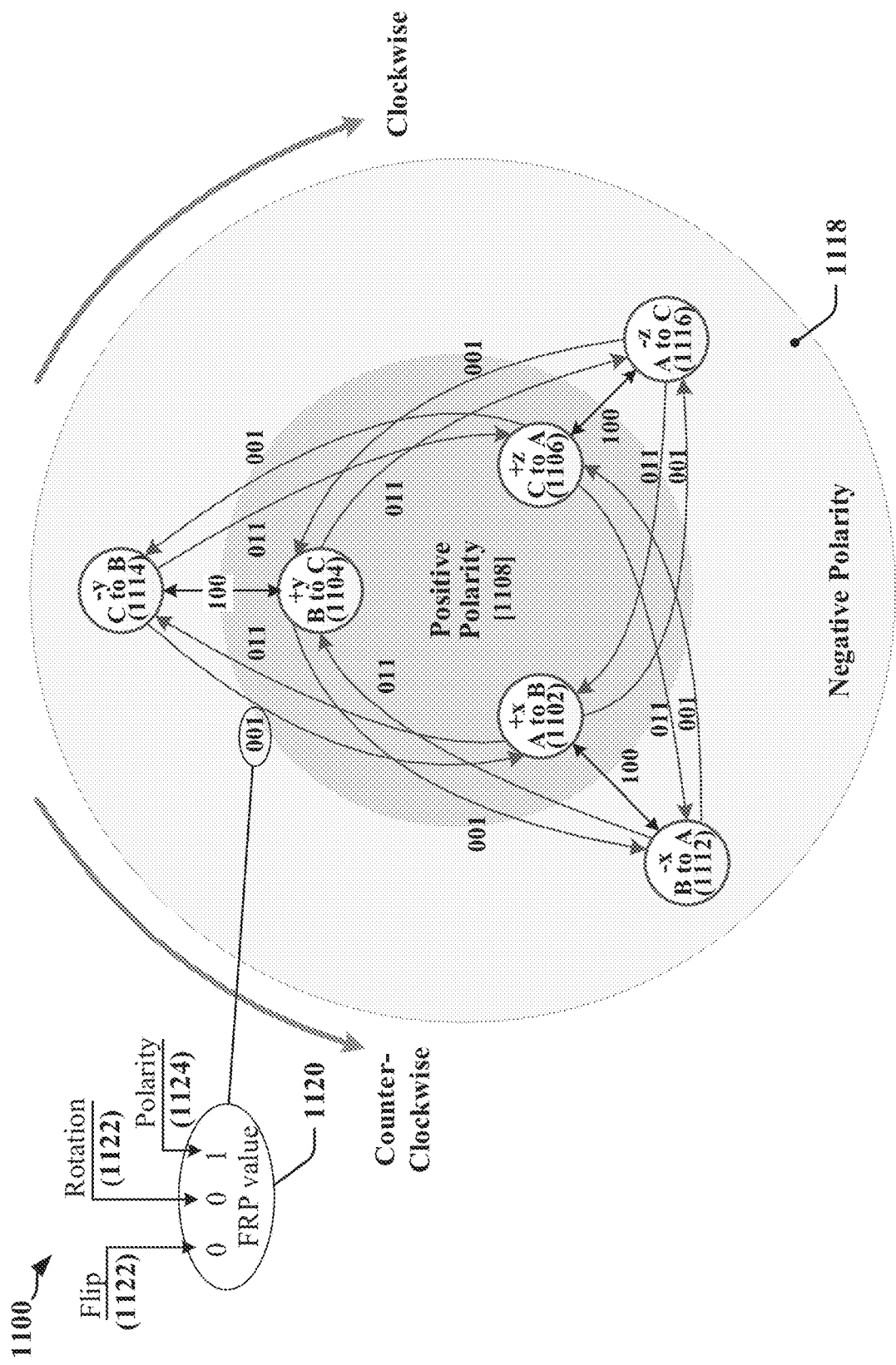
FIG. 11 illustrates a first example of state transitions in a simplified C-PHY interface adapted in accordance with certain aspects disclosed herein.

A second simplification may be achieved by eliminating double transitions. FIG. 11 illustrates a state transition diagram 1100 illustrating a first set of transitions that may be available in such a simplified C-PHY interface. The transitions between signaling states 1102, 1104, 1106, 1112, 1114, 1116 may be represented by an FRP symbol 1120. The subset of all possible 3-phase transitions eliminates double transitions, as illustrated in the example of signaling 1002, 1052 of FIG. 10. In this example, receiver simplification is accomplished by avoiding the use of double-transition symbols (FRP symbols 0 and 2), the mask delay elements in the receiver clock recovery circuit are simplified.

Figure 12:
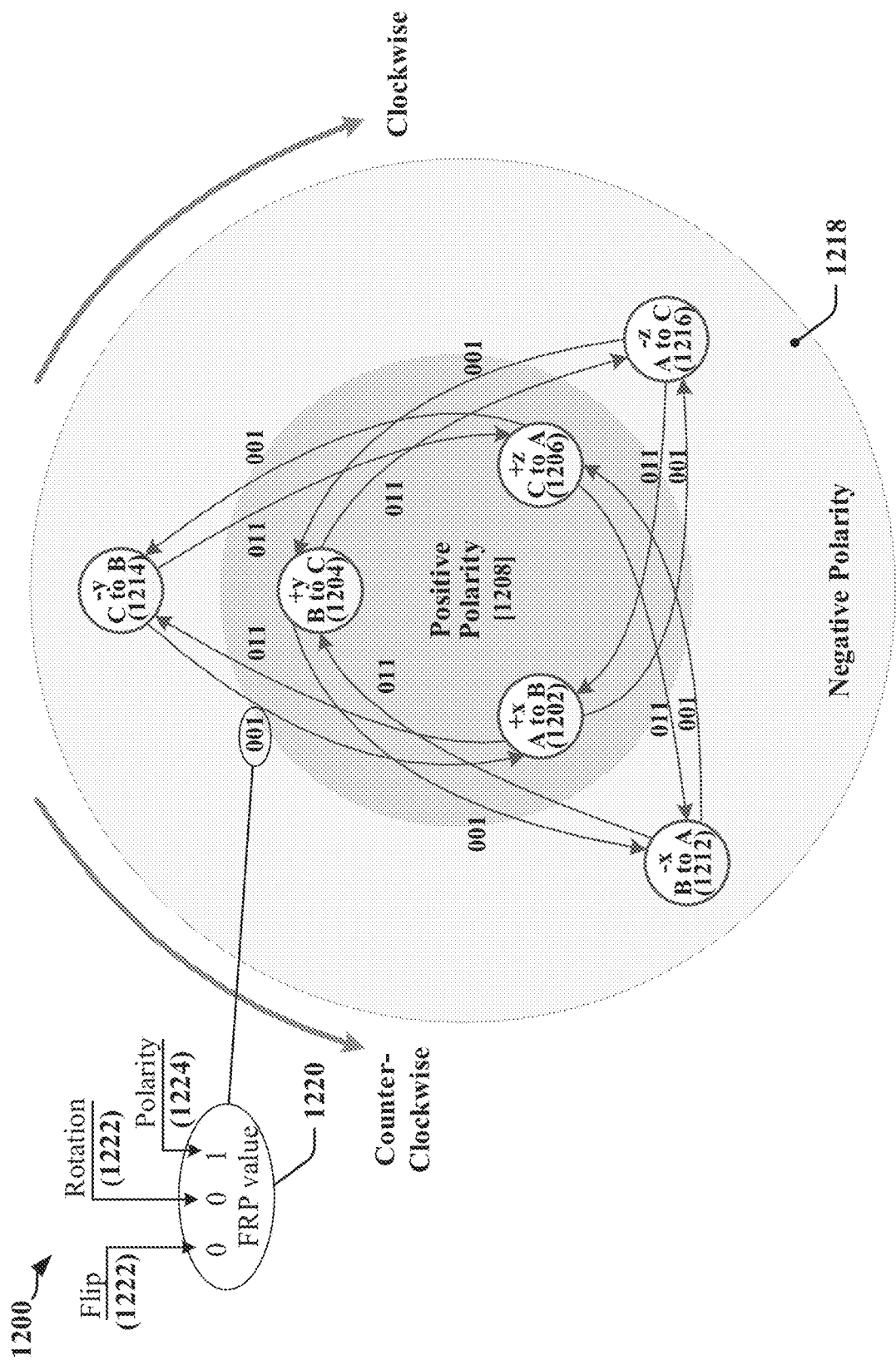
FIG. 12 illustrates a second example of state transitions in a simplified C-PHY interface adapted in accordance with certain aspects disclosed herein.

A third simplification may be achieved by eliminating double-transition symbols and triple transition symbols. FIG. 12 illustrates a state transition diagram 1200 illustrating a second set of transitions that may be available in a simplified C-PHY interface. The transitions between signaling states 1202, 1204, 1206, 1212, 1214, 1216 may be represented by an FRP symbol 1220. Mask delay elements in the receiver clock recovery circuit can be eliminated in this example by eliminating the double-transition symbols (FRP symbols 0 and 2) and the triple-transition symbols (FRP symbol 4), leaving only the two single-transition symbols (FRP symbols 1 and 3). Although the state transitions are simplified in the second and third simplifications, the symbol timing is still encoded in the transmitted symbols. There is still a transition in the state diagram at every symbol boundary.

Figure 13:
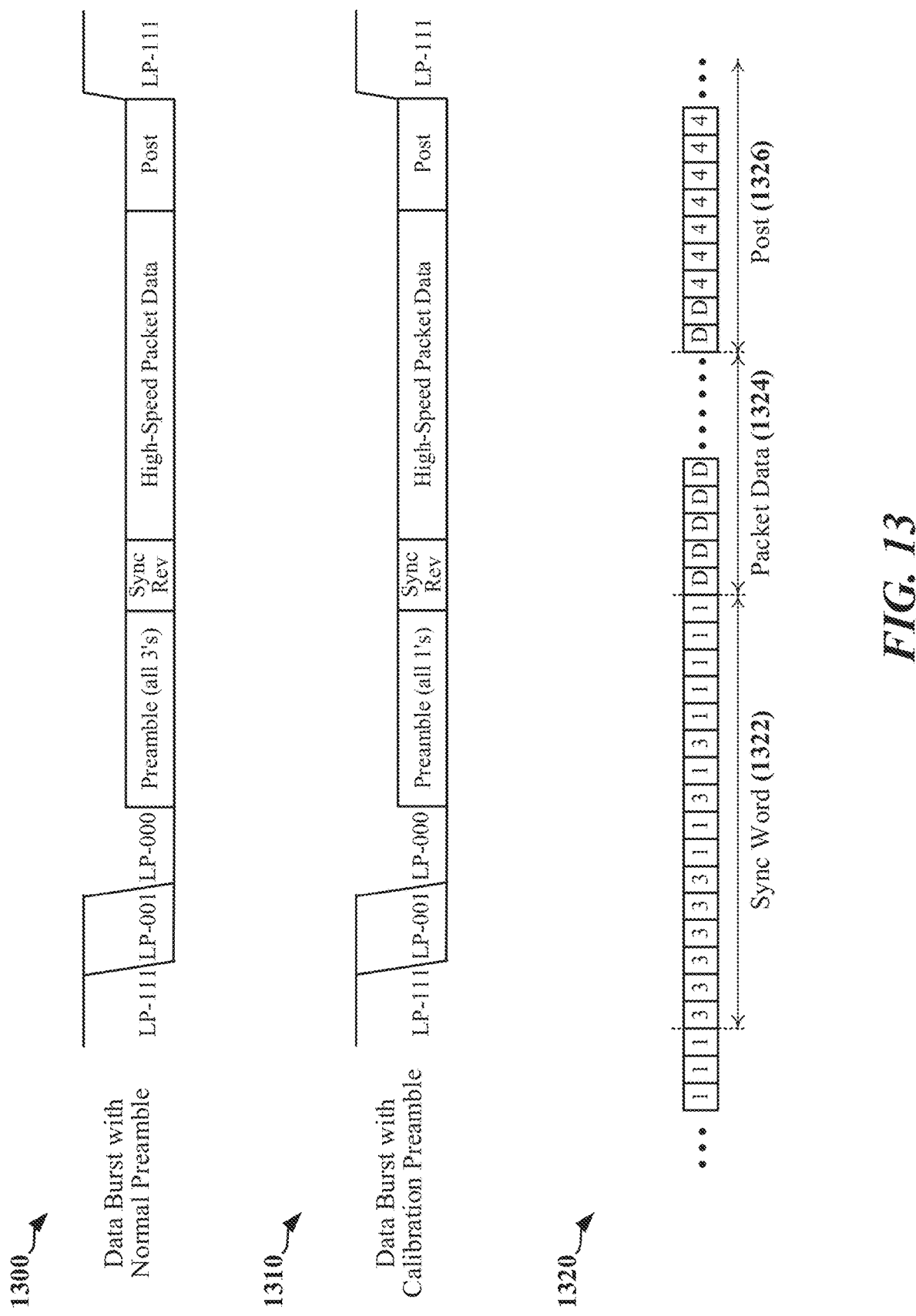
FIG. 13 illustrates burst waveforms in a simplified C-PHY interface adapted in accordance with certain aspects disclosed herein.

FIG. 13 shows two examples of burst waveforms 1300 and 1310. A first burst waveform 1300 includes a preamble with all FRP-3 symbols. A second burst waveform 1310 includes a preamble with all FRP-1 symbols. A different Sync Word 1322 having only FRP-1 and FRP-3 symbols can be used. This Sync Word 1322 may be longer than the traditional 7-symbol Sync Word for more robust detection and to provide consistency with changed lengths of the data words.

FIG. 13 also includes an example 1320 of a 16-bit Sync Word 1322 that follows an all-ones preamble and precedes the packet data 1324. The packet data 1324 includes only FRP symbols having values 1 and 3 (the single-transition symbols) that can be recovered without the use of a calibrated clock recovery circuit. An FRP symbol value 1 may be used to encode a binary zero and FRP symbol value 3 may be used to encode a binary one. In one example, 16-symbol groups may be interpreted as 16-bit words. Following the packet data 1324, a normal Post sequence 1326 may be transmitted with all FRP-4 symbols. In another example, 17-symbol groups may be transmitted in the Packet Data 1324 portion of the burst, where the Most Significant Symbol of the 17-symbol group is a symbol value of 1 for data words and is a symbol value of 3 for the Post sequence 1326 or other control words. In this example, the least significant 16 symbols of the 17-symbol sequence during the Post sequence 1326 have a predefined fixed value that identifies the word as a Post sequence 1326, and more than one sequences can serve as the post sequence 1326. The transmission of one extra symbol may be less efficient compared to transmitting only 16-symbol sequences consisting of symbol values 1 and 3, followed by all FRP-4 symbols for the Post sequence 1326, but only single-transition symbols (FRP symbol values of 1 and 3) are used throughout the burst. Limiting the burst to single-transition symbols can further simplify the clock recovery circuit.

Figure 14:
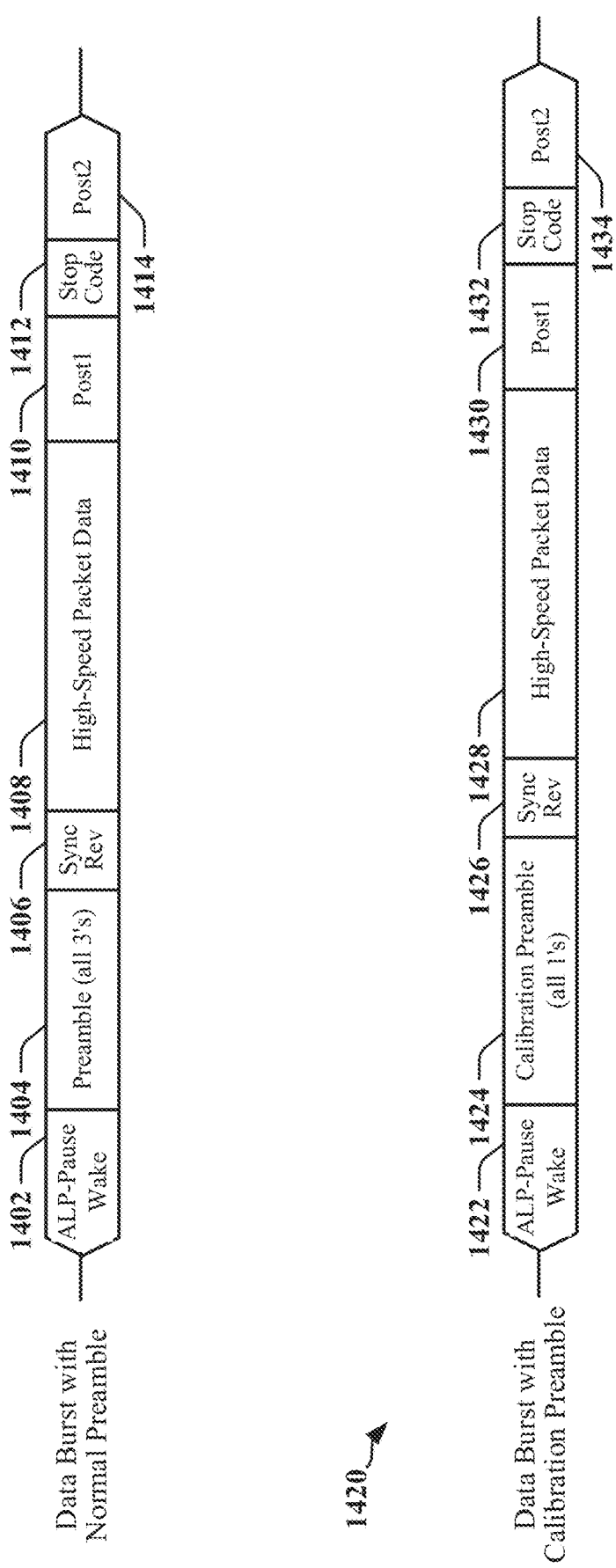
FIG. 14 illustrates transmission bursts in C-PHY interface operated in an alternate low-power (ALP) mode in accordance with certain aspects disclosed herein.

FIG. 14 illustrates examples of transmission bursts 1400, 1420 using C-PHY alternate low-power (ALP) mode. In ALP mode, a C-PHY interface maintains high-speed, low-voltage signaling and provides additional command and control codes. ALP mode uses solely high-speed signaling and Legacy low-power, high-voltage mode signaling is not used. In a conventional C-PHY interface, the Stop Code 1412, 1432 is transmitted as an unmapped 7-symbol sequence.

According to certain aspects, the Stop Code 1412, 1432 prior to Post2 1414, 1434 may be transmitted in a context-sensitive manner when 16-symbol groups are transmitted. For example, the Stop Code 1412, 1432 can be any pre-assigned sequence of FRP-1 and FRP-3 symbols that follows Post1 1410, 1430. Confusion with Packet Data can be avoided when no other sequence of FRP-1 and FRP-3 symbols follow Post1 1410, 1430.

According to certain aspects, a pre-defined value may be assigned to serve as the Stop Code 1412, 1432 when 17-symbol groups are transmitted. The Stop Code 1412, 1432 may have the most-significant symbol equal to 3 and the least significant 16 symbols set to a selected, configured or predefined sequence that is different from the sequence used for Post1 1410, 1430 and Post2 1414, 1434.

Examples of Processing Circuits and Methods

Figure 15:
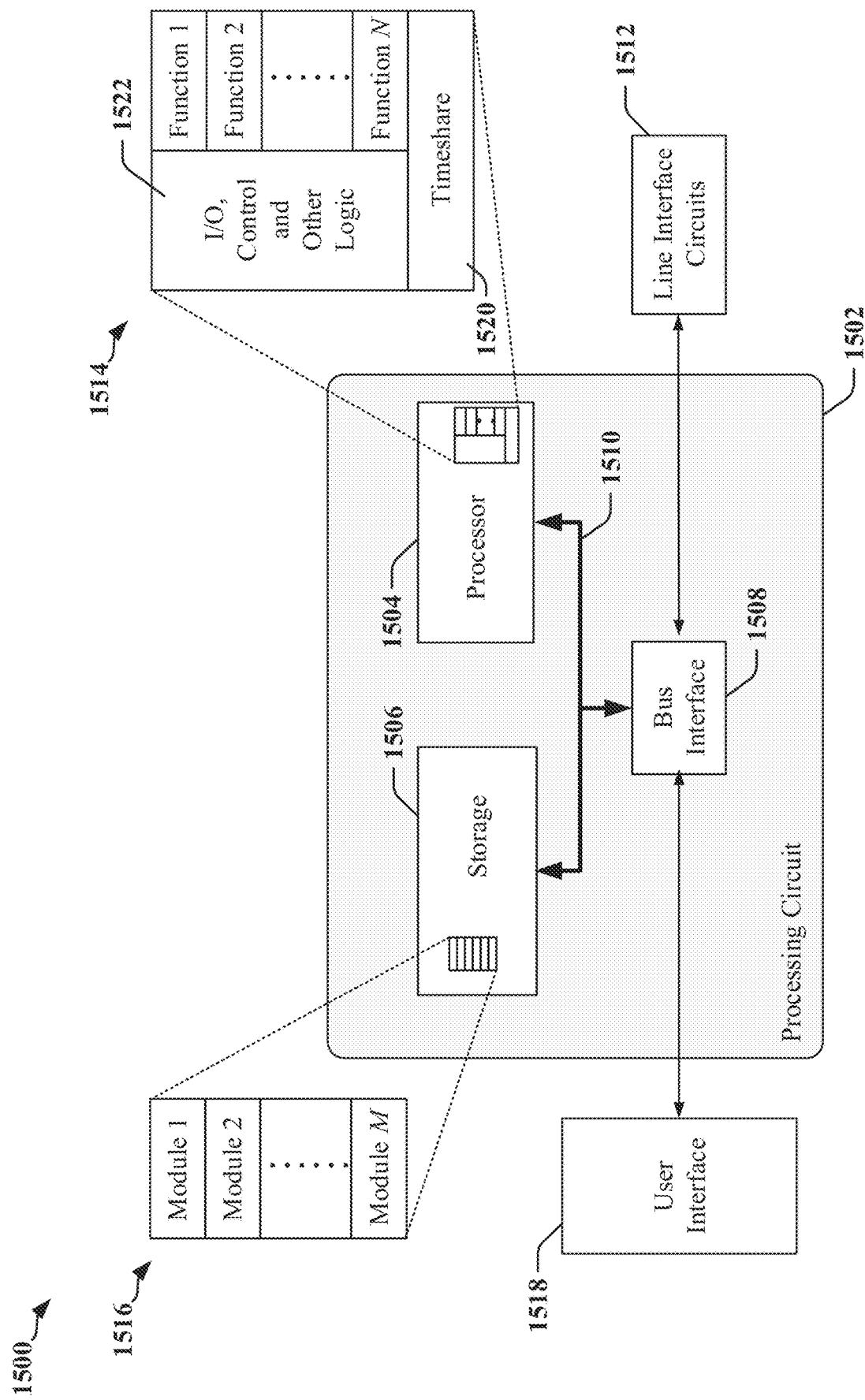
FIG. 15 illustrates an example of an apparatus employing a processing circuit that may be adapted according to certain aspects disclosed herein.

FIG. 15 is a conceptual diagram 1500 illustrating a simplified example of a hardware implementation for an apparatus employing a processing circuit 1502 that may be configured to perform one or more functions disclosed herein. In accordance with various aspects of the disclosure, an element, or any portion of an element, or any combination of elements as disclosed herein may be implemented using the processing circuit 1502. The processing circuit 1502 may include one or more processors 1504 that are controlled by some combination of hardware and software modules. Examples of processors 1504 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more line interface circuits 1512. A line interface circuit 1512 may be provided for each networking technology supported by the processing circuit. In some instances, multiple networking technologies may share some or all of the circuitry or processing modules found in a line interface circuit 1512. Each line interface circuit 1512 provides a means for communicating with various other apparatus over a transmission medium. Depending upon the nature of the apparatus, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a "flash drive," a card, a stick, or a key drive), a RAM, a ROM, a programmable ROM (PROM), an erasable PROM (EPROM), an EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as the line interface circuits 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to the line interface circuits 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the line interface circuits 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

In one example, the processing circuit 1502 may be provided in an apparatus that includes a communication interface coupled to the line interface circuits 1512 and configured to communicate data using a 3-phase signal transmitted in different phases on all three wires of a 3-wire communication link, and correction logic configured to correct phase relationships between two or more signals carried on the 3-wire communication link. The processing circuit 1502 may be configured to determine presence of a misalignment of the 3-wire communication link, and cause the correction logic to invert a first bit of a 3-bit symbol corresponding to a transition of signaling state of the 3-wire interface when a misalignment of the 3-wire communication link involving two or more wires is determined to affect the phase relationships between two or more signals carried on the 3-wire interface.

The processing circuit 1502 may be configured to select a table used to map data values to sequences of symbols based on whether a misalignment of the 3-wire communication link is determined to be present. Each symbol may be a 3-bit symbol, in which the first bit is inverted in a first table that is selected when the misalignment of the 3-wire communication link is determined to affect phase relationships between the two or more signals. The first bit in each symbol of the sequence of symbols is not inverted in a second table that is selected when the misalignment of the 3-wire communication link is determined not to affect phase relationships between the two or more signals.

The processing circuit 1502 may be configured to determine the presence of the misalignment of the 3-wire communication link by toggling the first bit in each symbol of a sequence of symbols transmitted on the 3-wire communication link during synchronization of the 3-wire communication link until synchronization information is decoded from sequence of symbols. The storage 1506 may maintain configuration information that indicates whether of the misalignment of the 3-wire communication link is present.

Figure 16:
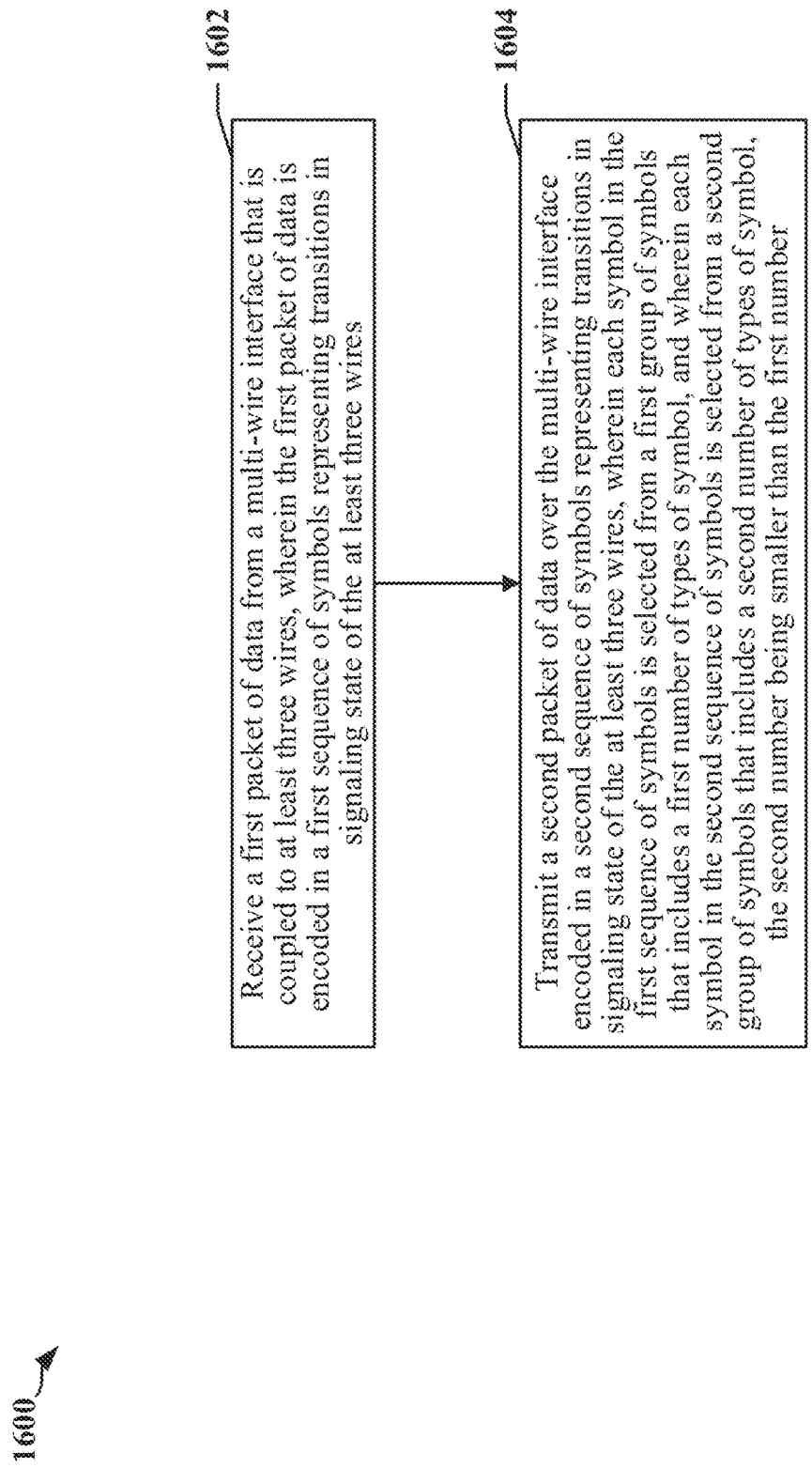
FIG. 16 is a flowchart of a method of communication in accordance with certain aspects disclosed herein.

FIG. 16 is a flowchart 1600 of a method of communication. The method may be performed by a device that includes a multi-wire interface coupled to at least three wires of a communication link. The multi-wire interface may be configured for communicating using a 3-phase signal transmitted over three wires. In one example, the device may include or cooperate with a processing circuit 1502.

At block 1602, the device may receive a first packet of data from a multi-wire interface that is coupled to at least three wires. The first packet of data may be encoded in a first sequence of symbols representing transitions in signaling state of the at least three wires. In one example, the first sequence of symbols includes up to five types of symbol.

At block 1604, the device may transmit a second packet of data over the multi-wire interface encoded in a second sequence of symbols representing transitions in signaling state of the at least three wires. In one example, the second sequence of symbols may include two or three types of symbol. Each symbol in the second sequence of symbols may be selected from a second group of symbols that includes a second number of types of symbol, the second number being smaller than the first number.

In one example, the device may receive a third packet of data through the multi-wire interface. The third packet of data may be encoded in a third sequence of symbols representing transitions in signaling state of the three wires, the third packet of data being responsive to the second packet of data.

In certain examples, the multi-wire interface is a three-wire interface. In one example, the first sequence of symbols may include up to five types of symbol, and the second sequence of symbols may include two or three types of symbol. The multi-wire interface is operated in accordance with a C-PHY protocol. The three-wire interface may be operated in accordance with an alternate low-power C-PHY protocol.

In some examples, the transitions in signaling state of the at least three wires are operative to cause at least one zero-crossing in a receiver circuit coupled to the multi-wire interface. The first sequence of symbols may include a symbol operative to cause three zero-crossings in a receiver circuit coupled to the multi-wire interface. The second sequence of symbols includes symbols operative to cause no more than two zero-crossings in a receiver circuit coupled to the multi-wire interface. The second sequence of symbols may include symbols operative to cause no more than one zero-crossing in a receiver circuit coupled to the multi-wire interface.

Figure 17:
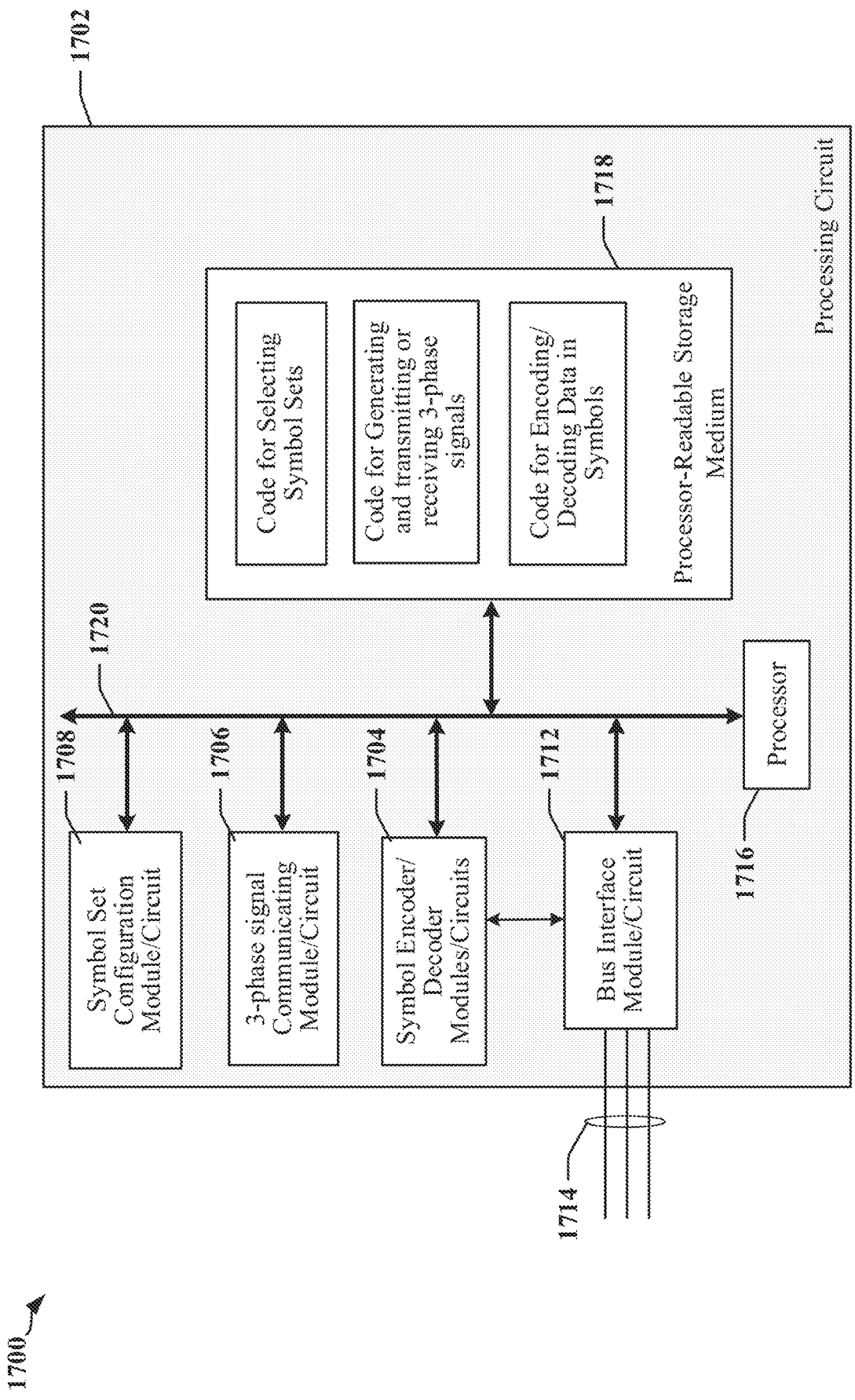
FIG. 17 illustrates an example of a hardware implementation for an apparatus employing a processing employing a processing circuit adapted according to certain aspects disclosed herein.

FIG. 17 is a diagram illustrating a simplified example of a hardware implementation for an apparatus 1700 employing a processing circuit 1702. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706 and 1708, a plurality of different encoders in an interface circuit 1712, line drivers configurable to drive connectors or wires 1714 of a communication link and the processor-readable storage medium 1718. The bus 1720 may also link various other circuits such as timing sources, peripherals, voltage regulators, and power management circuits, which are well known in the art, and therefore, will not be described any further.

The processor 1716 is responsible for general processing, including the execution of software stored on the processor-readable storage medium 1718. The software, when executed by the processor 1716, causes the processing circuit 1702 to perform the various functions described supra for any particular apparatus. The processor-readable storage medium 1718 may also be used for storing data that is manipulated by the processor 1716 when executing software. The processing circuit 1702 further includes at least one of the modules 1704, 1706 and 1708. The modules may be software modules running in the processor 1716, resident/stored in the processor-readable storage medium 1718, one or more hardware modules coupled to the processor 1716, or some combination thereof.

In one configuration, the apparatus 1700 includes circuits or modules 1704 for determining presence of a misalignment of the 3-wire interface involving two or more wires, and circuits or modules 1704, 1706 for inverting a first bit of a 3-bit symbol encoded in a transition of signaling state of the 3-wire bus when the misalignment of the 3-wire interface is determined to affect phase relationships between two or more signals carried on the three wires.

In one example, the apparatus 1700 may include an interface circuit 1712 configured to communicate data using a 3-phase signal transmitted in different phases on all three wires 1714 of a 3-wire communication link. The processor 1716 may be configured to cause processing circuit 1702 to receive, a first packet of data from the interface circuit 1712, the first packet of data being encoded in a first sequence of symbols representing transitions in signaling state of the three wires 1714. Each symbol in the first sequence of symbols may be selected from a first group of symbols that includes a first number of types of symbol. The processor 1716 may be further configured to cause processing circuit 1702 to transmit a second packet of data over the interface circuit 1712, the second packet of data being encoded in a second sequence of symbols representing transitions in signaling state of the three wires 1714. Each symbol in the second sequence of symbols may be selected from a second group of symbols that includes a second number of types of symbol, the second number being smaller than the first number. In some implementations, the second sequence of symbols may include two or three types of symbol. In some implementations, the first sequence of symbols may include up to five types of symbol.

The processor 1716 may be configured to cause processing circuit 1702 to receive from the interface circuit 1712, a third packet of data encoded in a third sequence of symbols representing transitions in signaling state of the at least three wires, the third packet of data being responsive to the second packet of data.

The apparatus 1700 may be adapted to communicate in accordance with a C-PHY protocol and/or a low-power C-PHY protocol. Transitions in signaling state of the three wires 1714 may be operative to cause at least one zero-crossing in a receiver circuit coupled to the multi-wire communication link. The first sequence of symbols may include a symbol operative to cause three zero-crossings in a receiver circuit coupled to the multi-wire communication link. The second sequence of symbols includes symbols may be operative to cause no more than two zero-crossings in a receiver circuit coupled to the multi-wire communication link. The second sequence of symbols may include symbols operative to cause no more than one zero-crossing in a receiver circuit coupled to the multi-wire communication link.

In another example, the processor-readable storage medium 1718 includes, stores or maintains processor-executable code for receiving a first packet of data from a multi-wire interface that is coupled to at least three wires, and transmitting a second packet of data over the multi-wire interface encoded in a second sequence of symbols representing transitions in signaling state of the at least three wires. The first packet of data may be encoded in a first sequence of symbols representing transitions in signaling state of the at least three wires. Each symbol in the first sequence of symbols may be selected from a first group of symbols that includes a first number of types of symbol, and each symbol in the second sequence of symbols may be selected from a second group of symbols that includes a second number of types of symbol, the second number being smaller than the first number. The processor-readable storage medium 1718 may further include code for receiving a third packet of data from the multi-wire interface. The third packet of data may be encoded in a third sequence of symbols representing transitions in signaling state of the three wires, the third packet of data being responsive to the second packet of data.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communication performed at a first device, comprising:
   receiving a first packet of data from a multi-wire interface that is coupled to at least three wires, wherein the first packet of data is encoded in a first sequence of symbols representing transitions in signaling state of the at least three wires; and
   transmitting a second packet of data over the multi-wire interface encoded in a second sequence of symbols representing transitions in signaling state of the at least three wires,
   wherein each symbol in the first sequence of symbols is selected from a first group of symbols that includes a first number of types of symbol, and
   wherein each symbol in the second sequence of symbols is selected from a second group of symbols that includes a second number of types of symbol, the second number being smaller than the first number.

2. The method of claim 1, further comprising:
   receiving a third packet of data from the multi-wire interface, wherein the third packet of data is encoded in a third sequence of symbols representing transitions in signaling state of the at least three wires, the third packet of data being responsive to the second packet of data.

3. The method of claim 1, wherein the multi-wire interface is a three-wire interface, the first sequence of symbols includes up to five types of symbol, and the second sequence of symbols includes two or three types of symbol.

4. The method of claim 3, wherein the three-wire interface is operated in accordance with a C-PHY protocol.

5. The method of claim 3, wherein the three-wire interface is operated in accordance with an alternate low-power C-PHY protocol.

6. The method of claim 1, wherein the transitions in signaling state of the at least three wires are operative to cause at least one zero-crossing in a receiver circuit coupled to the multi-wire interface.

7. The method of claim 6, wherein the second sequence of symbols includes symbols operative to cause no more than two zero-crossings in the receiver circuit coupled to the multi-wire interface.

8. The method of claim 6, wherein the second sequence of symbols includes symbols operative to cause no more than one zero-crossing in the receiver circuit coupled to the multi-wire interface.

9. The method of claim 1, wherein the first sequence of symbols includes a symbol operative to cause three zero-crossings in a receiver circuit coupled to the multi-wire interface.

10. An apparatus comprising:
    a communication interface configured to communicate data using a signal transmitted in different phases on all wires of a multi-wire communication link; and
    a processing circuit configured to:
       receive from the communication interface, a first packet of data encoded in a first sequence of symbols representing transitions in signaling state of at least three wires of the multi-wire communication link; and
       transmit on the communication interface, a second packet of data encoded in a second sequence of symbols representing transitions in signaling state of the at least three wires of the multi-wire communication link,
    wherein each symbol in the first sequence of symbols is selected from a first group of symbols that includes a first number of types of symbol, and
    wherein each symbol in the second sequence of symbols is selected from a second group of symbols that includes a second number of types of symbol, the second number being smaller than the first number.

11. The apparatus of claim 10, wherein the processing circuit is further configured to:
    receive from the communication interface, a third packet of data encoded in a third sequence of symbols representing transitions in signaling state of the at least three wires, the third packet of data being responsive to the second packet of data.

12. The apparatus of claim 10, wherein the communication interface is a three-wire communication interface, the first sequence of symbols includes up to five types of symbol, and the second sequence of symbols includes two or three types of symbol.

13. The apparatus of claim 12, wherein the communication interface is operated in accordance with a C-PHY protocol.

14. The apparatus of claim 12, wherein the communication interface is operated in accordance with an alternate low-power C-PHY protocol.

15. The apparatus of claim 10, wherein the transitions in signaling state of the at least three wires are operative to cause at least one zero-crossing in a receiver circuit coupled to the multi-wire communication link.

16. The apparatus of claim 15, wherein the second sequence of symbols includes symbols operative to cause no more than two zero-crossings in the receiver circuit coupled to the multi-wire communication link.

17. The apparatus of claim 15, wherein the second sequence of symbols includes symbols operative to cause no more than one zero-crossing in the receiver circuit coupled to the multi-wire communication link.

18. The apparatus of claim 10, wherein the first sequence of symbols includes a symbol operative to cause three zero-crossings in a receiver circuit coupled to the multi-wire communication link.

19. A processor-readable non-transitory storage medium storing processor-executable code, comprising code for:
receiving a first packet of data from a multi-wire interface that is coupled to at least three wires, wherein the first packet of data is encoded in a first sequence of symbols representing transitions in signaling state of the at least three wires; and
transmitting a second packet of data over the multi-wire interface encoded in a second sequence of symbols representing transitions in signaling state of the at least three wires,
wherein each symbol in the first sequence of symbols is selected from a first group of symbols that includes a first number of types of symbol, and
wherein each symbol in the second sequence of symbols is selected from a second group of symbols that includes a second number of types of symbol, the second number being smaller than the first number.

20. The non-transitory storage medium of claim 19, further comprising code for:
receiving a third packet of data from the multi-wire interface, wherein the third packet of data is encoded in a third sequence of symbols representing transitions in signaling state of the at least three wires, the third packet of data being responsive to the second packet of data.

21. The non-transitory storage medium of claim 19, wherein the multi-wire interface is a three-wire interface, the first sequence of symbols includes up to five types of symbol, and the second sequence of symbols includes two or three types of symbol.

22. The non-transitory storage medium of claim 21, wherein the three-wire interface is operated in accordance with a C-PHY protocol.

23. The non-transitory storage medium of claim 21, wherein the three-wire interface is operated in accordance with an alternate low-power C-PHY protocol.

24. The non-transitory storage medium of claim 19, wherein the transitions in signaling state of the at least three wires are operative to cause at least one zero-crossing in a receiver circuit coupled to the multi-wire interface.

25. The non-transitory storage medium of claim 24, wherein the second sequence of symbols includes symbols operative to cause no more than two zero-crossings in the receiver circuit coupled to the multi-wire interface.

26. The non-transitory storage medium of claim 24, wherein the second sequence of symbols includes symbols operative to cause no more than one zero-crossing in the receiver circuit coupled to the multi-wire interface.

27. The non-transitory storage medium of claim 19, wherein the first sequence of symbols includes a symbol operative to cause three zero-crossings in a receiver circuit coupled to the multi-wire interface.

28. An apparatus comprising:
means for receiving packets of data from a multi-wire interface that is coupled to at least three wires, including a first packet of data that is encoded in a first sequence of symbols representing transitions in signaling state of the at least three wires; and
means for transmitting packets of data over the multi-wire interface, including a second packet of data that is encoded in a second sequence of symbols representing transitions in signaling state of the at least three wires,
wherein each symbol in the first sequence of symbols is selected from a first group of symbols that includes a first number of types of symbol, and
wherein each symbol in the second sequence of symbols is selected from a second group of symbols that includes a second number of types of symbol, the second number being smaller than the first number.

29. The apparatus of claim 28, wherein the means for receiving packets of data is configured to:
receive a third packet of data from the multi-wire interface, wherein the third packet of data is encoded in a third sequence of symbols representing transitions in signaling state of the at least three wires, the third packet of data being responsive to the second packet of data.

30. The apparatus of claim 28, wherein the multi-wire interface is a three-wire interface, the first sequence of symbols includes up to five types of symbol, and the second sequence of symbols includes two or three types of symbol.

* * * * *